United States Patent
Huebler et al.

(10) Patent No.: US 8,969,743 B2
(45) Date of Patent: Mar. 3, 2015

(54) DYNAMIC SCALE WITH MULTIPLE, CASCADED WEIGHING PANS, AND METHOD TO OPERATE THE DYNAMIC SCALE WITH CASCADED WEIGHING OF ITEMS MOVING THERETHROUGH

(75) Inventors: Uwe Huebler, Neuenhagen (DE); Axel Kieser, Berlin (DE); Torsten Schlaaff, Panketal (DE)

(73) Assignee: Francotyp-Postalia GmbH, Birkenwerder (DE)

( * ) Notice: Subject to any disclaimer, the term of this patent is extended or adjusted under 35 U.S.C. 154(b) by 392 days.

(21) Appl. No.: 13/456,523

(22) Filed: Apr. 26, 2012

(65) Prior Publication Data

US 2012/0279787 A1    Nov. 8, 2012

(30) Foreign Application Priority Data

May 2, 2011    (DE) .......................... 10 2011 100 176

(51) Int. Cl.
| | |
|---|---|
| *G01G 19/414* | (2006.01) |
| *G01G 11/00* | (2006.01) |
| *G07B 17/02* | (2006.01) |
| *G01G 17/02* | (2006.01) |
| *G01G 19/00* | (2006.01) |
| *G01G 21/22* | (2006.01) |
| *G01G 21/23* | (2006.01) |

(52) U.S. Cl.
CPC .............. *G01G 19/005* (2013.01); *G01G 21/22* (2013.01); *G01G 21/23* (2013.01)
USPC ......... 177/25.15; 177/145; 705/407; 705/414

(58) Field of Classification Search
USPC ................ 177/25.15, 119, 145; 705/407, 414
See application file for complete search history.

(56) References Cited

U.S. PATENT DOCUMENTS

| | | | | |
|---|---|---|---|---|
| 4,437,561 | A * | 3/1984 | Hasegawa et al. ............ | 177/145 |
| 4,711,314 | A * | 12/1987 | Suzuki et al. .................. | 177/164 |
| 4,778,016 | A * | 10/1988 | Uchimura et al. ............. | 177/164 |
| 5,072,799 | A * | 12/1991 | Freeman et al. ............... | 177/244 |
| 5,190,117 | A * | 3/1993 | Freeman et al. ............... | 177/244 |
| 6,107,579 | A * | 8/2000 | Kinnemann ................... | 177/145 |
| 6,265,675 | B1 | 7/2001 | Huebler | |
| 6,433,288 | B1 * | 8/2002 | Olafsson ........................ | 177/145 |
| 6,907,409 | B1 | 6/2005 | Huebler | |
| 8,237,067 | B2 * | 8/2012 | Troisi et al. .................... | 177/145 |
| 8,698,012 | B2 * | 4/2014 | Huebler et al. ................ | 177/145 |
| 2009/0008859 | A1 | 1/2009 | Fairweather et al. | |
| 2009/0032311 | A1 | 2/2009 | Duppre | |
| 2009/0139777 | A1 | 6/2009 | Lyga et al. | |

\* cited by examiner

*Primary Examiner* — Randy W Gibson
(74) *Attorney, Agent, or Firm* — Schiff Hardin LLP

(57) ABSTRACT

A dynamic scale has multiple weighing units, each equipped with a weighing cell and a weighing pan, the weighing pan lying in an upper plane and the weighing cell between a lower plane spaced from the upper plane in the direction of gravity. A transport device has a motor encoder and sensors, with the encoder and sensors being electrically connected with the inputs of a control unit. The multiple weighing units are serially adjacent in a transport path, with simultaneous cascaded arrangement of the weighing cells in the direction of gravity. The control unit simultaneously starts the weighing processes in all weighing cells in a dynamic weighing mode and controls a transport motor depending on signals of the sensors and the encoder and controls the dynamic scale depending on signals from the weighing cells.

14 Claims, 7 Drawing Sheets

Prior Art

DYNAMIC SCALE WITH MULTIPLE, CASCADED WEIGHING PANS, AND METHOD TO OPERATE THE DYNAMIC SCALE WITH CASCADED WEIGHING OF ITEMS MOVING THERETHROUGH

BACKGROUND OF THE INVENTION

1. Field of the Invention

The invention concerns a dynamic scale with multiple weighing pans and a method to operate such a dynamic scale. The invention allows an increased throughput of products of different dimensions that are to be weighed, in particular of unit loads to be weighed (for example of mail pieces and other shipments) but also of weighed goods which have no permanent, fixed dimensions. The invention is suitable for use in weighing systems, in franking systems with dynamic scales, or in mail systems of different delivery services, mail carriers and shippers which have a dynamic scale.

2. Description of the Prior Art

From EP 20 65 686 A1 (=US 2009/0139777 A1), a parallel arrangement of two weighing units is known in which the throughput can be increased via parallelization of the weighing process. However, additional devices to separate and merge the mail flow before and after the scale are necessary for this, which increases the space requirement. The parallel arrangement of two weighing units brings with it the problem of the markedly increased space requirement due to the two units to control the mail flow, a markedly increased control expenditure and higher costs.

From US 2009/032311 A1 (=WO 2007/057001 A1) ("Method to weigh with multiple weighing cells"), a device is known that avoids production lines that are specifically designed for the dimensions of objects to be weighed. The weighing of objects of different dimensions is enabled by the weighing units being arranged essentially transverse to the transport direction, with the products (goods, weighed goods) resting flat on the transport device. Because the products are weighed with their largest dimension aligned transverse to the transport direction, the distance between the goods is reduced, which leads to an increased throughput of the weighed goods given the same transport speed. The weighing units arranged in the same plane transverse to the transport direction are all of identical design and are oriented with their base plate on the same table plate. Each weighing unit has a weighing cells and a weighing pan with a transport device that is arranged on the weighing pan of the dynamic scale. In this method, the weighing signals of the weighing units must be coupled with one another and complicated calculation methods are used since a portion of the weight of the weighed good is distributed among the respective weighing units.

From EP 2017589A2 (=US 2009/008859 A1), a system is known in which at least two weighing units are connected in series. Short letters can be weighted at short intervals by means of one of the weighing units; given long letters, the weighing result is a superposition of the weighing results of both weighing units. The higher cost relative to a system with only a single weighing unit is disadvantageous. The arrangement of multiple weighing units in series makes a markedly increased computing cost necessary in the calculation of the weight values, which can be time-critical. Slippage/synchronization programs can occur between the weighing units, which can lead to impacts that affect the weighing result.

In the field of dynamic weighing in mail processing, various solutions from different vendors are already known. The companies Neopost and Pitney Bowes use weighing systems for flat weighing goods (mail pieces) supplied lying flat on their back sides so that a franking imprint can be applied on the front side of the mail pieces.

A device to weigh moving mail goods, in particular mail pieces (letters) arranged standing on an edge, is known from European Patent EP 974 81 B1. A transport belt driven by a motor runs on track rollers across a weighing plate that is equipped with a guide wall to guide the mail pieces. The guide wall is inclined at an angle of 108° relative to the table plate. The mail pieces tilted on their front sides slide further along the guide wall while the approximately horizontally arranged transport belt on which the mail pieces standing on edge are transported is moved further. Mail pieces means, for example, post cards, enveloped letters and other mail goods up to 20 mm thick. The throughput in the latter cited system amounts to approximately 50 letters per minute given dynamic weighing of the mail goods. The throughput of a franking machine is determined from the number of letters per time unit and amounts at most to 150 letters per minute. At a given transport speed and a letter interval from the leading letter edge of the one enveloped letter to the leading letter edge of the next enveloped letter (edge-to-edge), the throughput results from the quotient of the transport speed and the letter interval. The motor, the transport belt with track rollers and the weighing plate with guide wall load a weighing cell. At the weighing cell, the weighing plate with the transport belt and the track rollers as well as a first motor are arranged so that the weighing cell is loaded with an initial load. A first sensor is arranged at the intake of the weighing unit, which first sensor outputs a first signal to a control unit which starts the weighing process for a mail piece (letter). Moreover, a second sensor is provided at the outlet of the weighing unit, which second sensor outputs a second signal to a control unit which generates a message that a subsequent letter following the letter can be supplied. The aforementioned components form the dynamic scale that, together with a franking machine of the Jetmail® type, is operated in a franking system of the applicant with a system speed which concurrently determines the throughput of mail pieces.

In an advanced extended version, a franking system from Francotyp-Postalia GmbH has at least one automatic feed station, a dynamic scale and a franking machine located downstream in the mail flow. In the Centormail®-type franking machine, a transport system is used in which successive mail pieces standing on an edge are transported. Given mail pieces such as letters, a letter spectrum with letter lengths from 140 mm to 353 mm can be processed. Letters in the C6 length format thus have an average letter length of 229 mm. Customer requirements for a higher throughput of the franking system with the Centormail® franking machine make it necessary that either the transport speed for mail pieces (in particular for letters) in the system is increased, or the distance between the letters is reduced.

A method and arrangement to determine a weight with a dynamic scale are known from the European Patent 1014052 B1. The arrangement has a transport device, a weighing plate, a weighing cell, sensors and an electronic control unit which—in addition to a control of the transport device—implements an evaluation of the measurement values communicated by the weighing cell and the output of a corrected weight value to a franking machine via an interface. The throughput of the aforementioned system is limited to approximately 50 letters per minute. Although the throughput could be even further increased with a higher transport speed (at the cost of the precision of the weighing value and reliability of the mail piece transport), the precision of the weighing value and reliability of the mail piece transport should specifically not be reduced. When the dynamic scale is used as a peripheral device for a franking system, the franking system limits the transport speed of a mail piece. An increase of the system speed is not possible, or is possible within very narrow, very precisely considered limits. Limiting factors are possibly also provided by other peripheral devices of the franking system, for example a separation certainty of an automatic mail piece separator and feed station that decreases with increasing speed. For example, components (motors, gears, loads) and service life matched to and protected by the present system speed of the Centormail® franking system are used. Additional limitations also result from the processing times, for example the calculation speed, and the billing time for franking imprints in the dynamic weighing mode of the Centormail® franking system. The increasing customer requirements for the throughput of the system make it necessary to find new designs.

SUMMARY OF THE INVENTION

An object of the present invention is to overcome the disadvantages of the prior art and achieve a dynamic scale with multiple weighing pans, as well as a method to increase the throughput of weighed goods.

The invention concerns a dynamic scale with a number of weighing units, wherein each of the weighing units is equipped at least with a weighing cell and with a weighing pan, wherein the weighing pan is situated at an upper level and the weighing cell is arranged between the upper level and a lower level distanced from the upper level in the direction of gravity (i.e. opposite to the y-direction).

A first weighing unit and at least one weighing unit with a serially adjacent (in the transport path) arrangement of a second weighing pan relative to the first weighing pan are provided given an arrangement of the weighing cells that is simultaneously functionally cascaded in the direction of gravity. The at least second weighing unit is attached with its lower level situated in an x/z reference plane which is orthogonal to the y-direction.

A common control unit of the dynamic scale is provided for a simultaneous, complete start of the weighing processes in a dynamic weighing mode in all weighing cells; to activate all motors electrically connected with said control unit depending on signals of the sensors and the encoder to determine and regulate the transport speed; and to evaluate the weight measurements. According to the invention, the dynamic scale is controlled depending on the signals of the weighing cells.

A dynamic scale with multiple weighing pans has a number of sensors and at least one transport device for the transport of a weighed good in a transport direction during the weighing. The multiple sensors and the encoder are electrically connected with the inputs of the common control unit. The transport device has a motor to drive the aforementioned transport device and an encoder, and the sensors and the encoder are electrically connected with the inputs of a control unit and the motor to drive the aforementioned transport device is electrically connected with the outputs of the control unit. For the weighing pans, at least n+1 sensors are arranged in the transport path of the dynamic scale. Each of the weighing units is equipped with a weighing pan shortened in the direction of transport. In a deviation from the norm, however, a weighing pan without transport device can also be arranged between two weighing pans respectively having a transport device. However, at least one first weighing pan of the weighing pans adjacent to one another has the transport device for weighed goods. A first weighing unit and at least one second weighing unit are thus provided whose weighing pans are arranged serially adjacent to one another in the transport path,
and are these are designed to be shorter in the transport direction and arranged in the same upper plane.

The weighing cells of each of the weighing units are arranged cascaded in the direction of gravity such that the weight of the weighed good, and the total weight of the first weighing unit and the weight of at least one additional weighing pan of the at least second weighing unit, loads the weighing cell of the said at least one second weighing unit as an initial load. This applies up to the n-th weighing unit, the weighing pan of which is arranged last in the transport path. The associated weighing cell is connected with a floor plate of the dynamic scale. A weighing cell of the same type can be used for all weighing cells. The weighing pan of the first weighing unit is arranged before the weighing pan of the second weighing unit in the transport direction. A first sensor is arranged near the upstream start of the transport device of the weighing pan of the first weighing unit; a second sensor is arranged near the downstream end of the transport device of the weighing pan of the first weighing unit; and a third sensor is arranged near the downstream end of the transport device of the weighing pan of the second weighing unit. The common control unit is programmed to activate a motor of the transport device of at least one first weighing unit upon arrival of a start signal, start a number of weighing processes in a dynamic weighing mode when the first sensor signals an arrival of the leading edge of a supplied good to be weighed, check, when the second sensor signals an arrival of the leading edge of a supplied good to be weighed, whether the electronics of the connected weighing cell of the first weighing unit deliver or have not yet delivered a stable signal, wherein given a stable signal multiple measurement values are present for a measurement curve and the measurement curve has at least two inflection points and two reversal points after a rising part, with which the weight measurement can be implemented successfully, activate at least one motor so that the good being weighed is transported further in the transport direction z onto the weighing pan of the second weighing unit, and an input/output unit to, upon a successful weight measurement, output a corresponding signal to an automatic feed station receding the first weighing unit to supply a subsequent good to be weighed to the weighing pan of the first weighing unit, or otherwise, to proceed with the weighing process with the weighing cell of the last used second weighing unit until the third sensor signals an arrival of the leading edge of the good being weighed at the end of the transport device of the last used weighing pan, check whether, upon arrival of the leading edge of a supplied good being weighed at the end of the transport device of the weighing pan of the second weighing unit, the electronics of the connected weighing cell of the second weighing unit deliver or have not yet delivered a stable signal, and either successfully end the weight measurement with the weighing cell of the second weighing unit, wherein the electronics of the connected weighing cell of the second weighing unit deliver a stable signal, or otherwise effect a switching of the dynamic scale from the dynamic weighing mode to a semi-dynamic weighing mode, wherein in a semi-dynamic weighing mode the at least one motor is controlled so that the transport of the good being weighed is halted or the good being weighed is transported back at least to the last used weighing pan, and then is weighed.

By means of the second weighing pan arranged in series in the weighing path, the weighing path is extended to the required dimension in the transport direction for weighing goods of larger dimensions, for example medium-to-large format mail pieces. By shortening the weighing pan of the first weighing unit in connection with the adjacent weighing pan of the second weighing unit (on whose weighing cell the weighing cell of the first weighing unit is arranged), a markedly shorter weighing good interval can be achieved for small-format mail pieces, and thus a markedly higher weighing good throughput without increasing the system speed (even for mixed mail).

The solution can advantageously be realized without significant effort in the same structural space which is required by the previously used dynamic scale of the Centormail franking machine.

The invention can be supplemented by the use of additional weighing units that can then be arranged in a repeated cascade. To apply load directly each weighing pan can be mechanically placed on a measurement point, or can be connected via an interposed support with a measurement point of the associated weighing cell to apply load indirectly. The weight of the weighed good and an additional preload due to the entire weight of the first weighing unit and due to the weight of the weighing pan of the second weighing unit and an interposed support therefore act on a measurement point of the weighing cell of the second weighing unit. That weighing cell at which the greatest weight value is active due to the additional preload is mechanically firmly connected via an attachment block with a floor plate of the dynamic scale. Due to the weight of the weighed good and that of all weighing units, in total a weight $F=m \cdot g$ is transmitted to the floor plate.

Given a dynamic scale that has two weighing units, the weighing cell of the second weighing unit mechanically firmly connected with the floor plate of the dynamic scale; given a dynamic scale that comprises three weighing units, however, a weighing cell of the third weighing unit is mechanically firmly connected with the floor plate of the dynamic scale; wherein the floor plate is arranged lying in the x/z reference plane. The third weighing unit again includes a weighing cell and a weighing pan. The weighing cell of the third weighing unit can be dimensioned for weighed goods whose weight exceeds the maximum weight in the measurement range of the weighing cell of the second weighing unit. This in principle results in a cascade-like weighing cell arrangement in which that weighing cell dimensioned for a higher weight is always arranged below (in the direction of gravity) a weighing cell dimensioned for a lower weight. The aforementioned cascade-like weighing cell arrangement can have a tower-like and/or staircase-like design combined with a serial arrangement of the weighing pans, which is explained in detail in the following.

The weighing pan of the second weighing unit is adjacent to the weighing pan of the first weighing unit in the transport direction, and the weighing pan of the third weighing unit is adjacent to the second weighing pan in the transport direction etc. In the weighing path, a transport device for weighed goods can again be arranged at intervals. Given transport of weighed goods, the weighing pans are successively loaded with the weight of the weighed good. Each weighing pan is shaped so that, from each weighing pan, the weight of the weighed good is conducted from the weighing pan to the associated weighing cell. If the weighed goods are, for example, small-format mail pieces, their weight can already be determined by the first weighing unit while the weighed good is still located on the first weighing pan in the transport path and is transported further in the transport direction, without an additional weighing pan being loaded. Such an early weight determination assumes that the weighing cell of the first weighing unit delivers a stable signal. The entire mechanical construction of the dynamic scale is therefore correspondingly rigid in its structure in order to limit oscillations of the dynamic scale or allow fluctuations to decay as quickly as possible. However, the weighing cell of the first weighing unit no longer delivers a stable signal if the required measurement time for the weighed good exceeds the available measurement time of the weighed good while the weighing cell is loaded, or if the weight of the weighed good distributed on two adjacent weighing pans already has an effect while the weighed good is transported further in the transport direction. At this point in time the weighing cell of the second weighing unit still delivers no stable signal for a weight value above zero grams. Given a weighed good that has a small length dimension, this is not even necessary since sufficient measurement time remains. Ultimately, the second weighing cell will deliver a stable signal when the weight of the weighed good lies within the weight measurement range of the second weighing cell. In principle, it only has yet to be determined which of the two weighing cells delivers a stable signal first. This reasonably also applies given an arrangement with three or more weighing cells. In an evaluation, the following cases are thus to be differentiated:

a) No weighing cell delivers a stable signal.

b) The first weighing cell delivers a stable signal.

c) The first weighing cell dos not deliver a stable signal, but the second weighing cell delivers a stable signal when the dimension of the weighed good in the transport direction exceeds the dimension of the weighed good that has the smaller measurements, or when the weight of a weighed good with smaller dimension in the transport direction exceeds a first weight threshold.

d) The first weighing cell and the second weighing cell do not deliver a stable signal, but the third weighing cell delivers a stable signal when the dimension of the weighed good in the transport direction exceeds the dimension of the weighed good that has the medium dimensions, or when the weight of the weighed good with medium dimensions exceeds a second weight threshold.

Due to the cascading arrangement of the weighing cells and the active direction of gravity, the weight values measured by the individual weighing units do not need to be offset with one another via complicated calculation methods. Depending on the delivery of a stable signal from the weighing cells during the transport of the weighed good in the transport direction, a switching respectively takes place of an evaluation of the measurement values that originate from one weighing unit to those measurement values that originate from an additional weighing unit whose weighing cell delivers a stable signal.

The method to increase the throughput of weighed goods with a dynamic scale with multiple weighing units includes the steps:

provide a first weighing unit and at least one second weighing unit, wherein the weighing units have a respective weighing pan with transport device and a respective weighing cell, supply a good to be weighed to the weighing pan of the first weighing unit, simultaneously start the weight measurement in all weighing cells, and implement the weight measurement of the good being weighed during its transport in the transport direction, in which the weighing cells of all weighing units are participating, supply a subsequent good to be weighed onto the weighing pan of the first weighing unit and/or transport the good being weighed further onto the weighing pan of the second weighing unit for additional weight measurement of said good being weighed during its transport in the transport direction z, depending on the signal of the weighing cell of the first weighing unit, and further operation of the dynamic scale depending on the signals of the weighing cells.

The common control unit implements the following steps:

activate the motor of the transport device of at least the first weighing unit via a common control unit upon arrival of a start signal, start the plurality of weighing processes in dynamic weighing mode via the control unit when a first sensor arranged upstream at the start of the first weighing unit signals an arrival of the leading edge of a supplied good to be weighed, when a second sensor arranged at the downstream end of the first weighing unit signals an arrival of the leading edge of a supplied good being weighed, check—via the control unit—whether the measurement electronics of the connected first weighing cell deliver or have not yet delivered a stable signal, wherein given a stable signal multiple measurement values are present for a measurement curve and the measurement curve has at least two inflection points and two reversal points after a rising portion, whereupon the weight measurement can be implemented successfully, transport the good being weighed further in the transport direction onto the weighing pan of the second weighing unit, upon successful weight measurement, output of a corresponding signal by the control unit via an input/output unit to an automatic feed station preceding the first weighing unit to supply a subsequent good to be weighed to the first weighing unit, or given an unsuccessful weight measurement, continue the weighing process with the weighing cell of the second weighing unit until a third sensor arranged at the downstream end of the second weighing unit signals an arrival of the leading edge of the a supplied good being weighed, and upon arrival of a supplied good being weighed, check whether the measurement electronics of the connected weighing cell of the second weighing unit deliver or have not yet delivered a stable signal, and establish that the weight measurement with the second weighing cell has ended successfully when the measurement electronics of the connected second weighing cell delivers a stable signal, or establish that the weight measurement with the second weighing cell has not successfully ended if the measurement electronics of the connected second weighing cell does not deliver a stable signal, switch the control unit from a dynamic weighing mode to a semi-dynamic weighing mode given an unsuccessful weight measurement, and activate the at least one motor via the control unit so that the transport of the good being weighed is halted or the good being weighed is transported back to the last used weighing pan, and then is weighed.

During the transport of a good being weighed, the scale switched into a dynamic weighing mode implements at least one weighing process. The goods being weighed are supplied by an automatic feed station (not shown) arranged upstream of the weighing pan of the first weighing unit after the control unit has output a corresponding feed signal to the automatic feed station via an input/output unit.

A first sensor arranged near the start of the weighing pan of the first weighing unit registers the leading edge of the good being weighed, and the weighing with the two weighing cells of the first weighing unit and the second weighing unit is started by the control unit of the dynamic scale (possibly with a time delay). Each good being weighed is transported in the transport direction by the transport device at the downstream end of the weighing pan of the first weighing unit, without a following good being weighed being supplied to the start of the weighing pan of the first weighing unit. A method to control the dynamic scale uses the sensor signals of at least n+1 sensors given n weighing pans, thus of at least three sensors given two weighing pans or, respectively, at least four sensors given three weighing pans etc. If the leading edge of the good being weighed reaches the end of the weighing pan of the first weighing unit, the second sensor arranged near the end of this weighing pan registers this. It is checked by the control unit of the dynamic scale whether a plausibly stable signal is output by the weighing cell of the first weighing unit. If this is the case, this signal can be processed further and the next mail good can be supplied to the system.

The shortening of the first weighing unit leads to the increase of the throughput to the desired value. However, this is not the case given goods being weighed that are of large dimensions in the transport direction, for example given long mail pieces. Therefore, the additional weighing takes place solely via the weighing cell of the second weighing unit until a stable result is present here. The weighing value can then be additionally processed, and the next good to be weighed can be supplied to the system. If the leading edge of the good being weighed reaches a last sensor arranged near the end of the last weighing pan in the transport path and a stable weighing value has not yet been determined that has been output by the associated weighing cell, the system switches into a semi-dynamic mode in which the transport of the good being weighed is halted or the good being weighed is driven back at least to the last weighing pan and is weighed again at a standstill by the associated weighing cell (i.e. in a semi-dynamic weighing mode). In the standstill the further transport of the good being weighed with the transport device is interrupted. After the end of the weighing process, the transport of the good being weighed in the transport direction is continued.

Such dynamic scales are suitable for franking systems. The goods being weighed are then mail pieces, for example enveloped letters or post cards or packages which are subsequently franked. The invention can be used both for dynamic scales that transport mail pieces resting on their back sides and for dynamic scales that transport mail pieces standing on edge, and for dynamic scales that can transport mail pieces in any arbitrary position between, thus at an angle not equal to 0° and not equal to 90° relative to the floor area of the scale, for example at an angle of 18° relative to the gravity vector.

DESCRIPTION OF THE PREFERRED EMBODIMENTS

Figure 1:
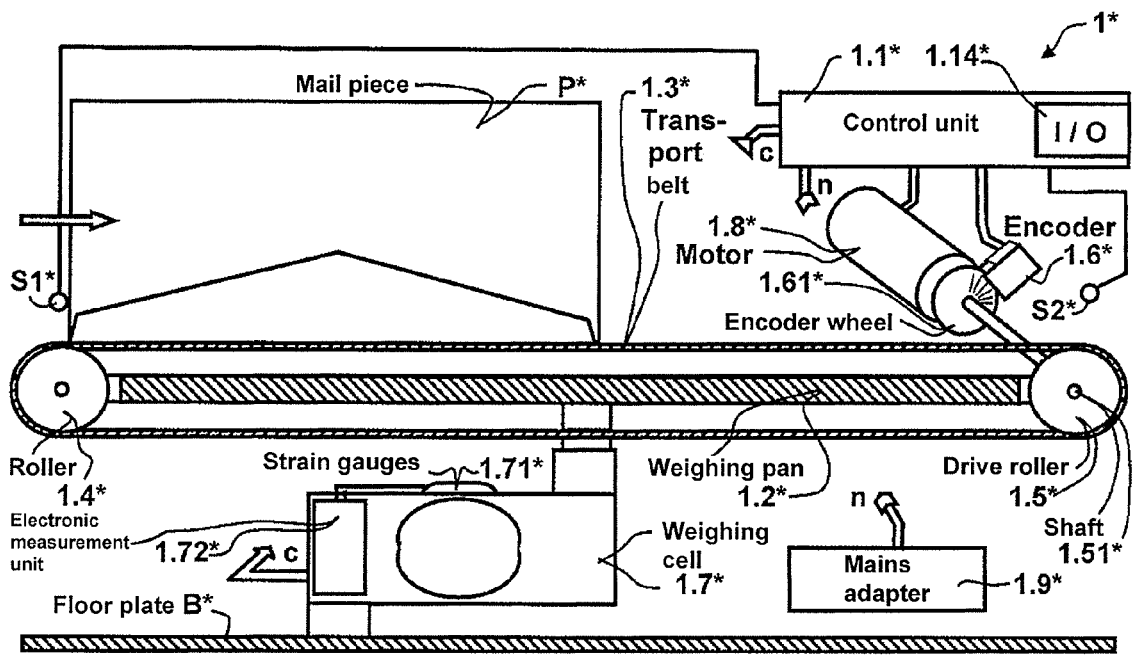
FIG. 1 is simplified presentation of a known dynamic scale.

Shown in FIG. 1 is a simplified representation of a known dynamic scale 1*, which is commercially available from Francotyp-Postalia for use together with a Centormail® franking machine in a mail processing system that is suitable for mixed mail and in which flat goods being weighed (mail pieces) are supplied standing on edge. A controller 1.1* of the dynamic scale 1* has an input/output interface 1.14* and can be connected via the latter with a franking machine (not shown). The controller 1.1* is connected in terms of control with a first sensor S1*, with a second sensor S2*, with an encoder 1.6*, with an electronic measurement unit 1.72* of a weighing cell 1.7*, and with a motor 1.8*, and is supplied from a mains adapter 1.9*. The weighing cell 1.7* has strain gauges 1.71* that are electrically connected with the electronic measurement unit 1.72*. A mail piece P* standing on edge and supplied in the transport direction z arrives on a transport belt 1.3* and is transported further in the transport direction z with an approximately constant velocity v=const. The transport belt 1.3* is arranged on a weighing pan and runs on rollers 1.4* and 1.5*. A supplied mail piece P* is transported in the transport direction z between a deflection roller 1.4* and a drive roller 1.5*, wherein the drive roller 1.5*, together with an encoder wheel 1.61*, is attached to a drive shaft 1.51*. The latter is slid onto and attached to a motor shaft (not shown) of a motor 1.8*. Alternatively, a common shaft produced from one piece is also possible. The encoder wheel 1.61* is a component of the encoder 1.6*. The weighing cell 1.7* is attached to a floor plate B* of the dynamic scale 1*. A more detailed mechanical design of the dynamic scale is described in European Patent 907 819 B1.

Figure 2A:
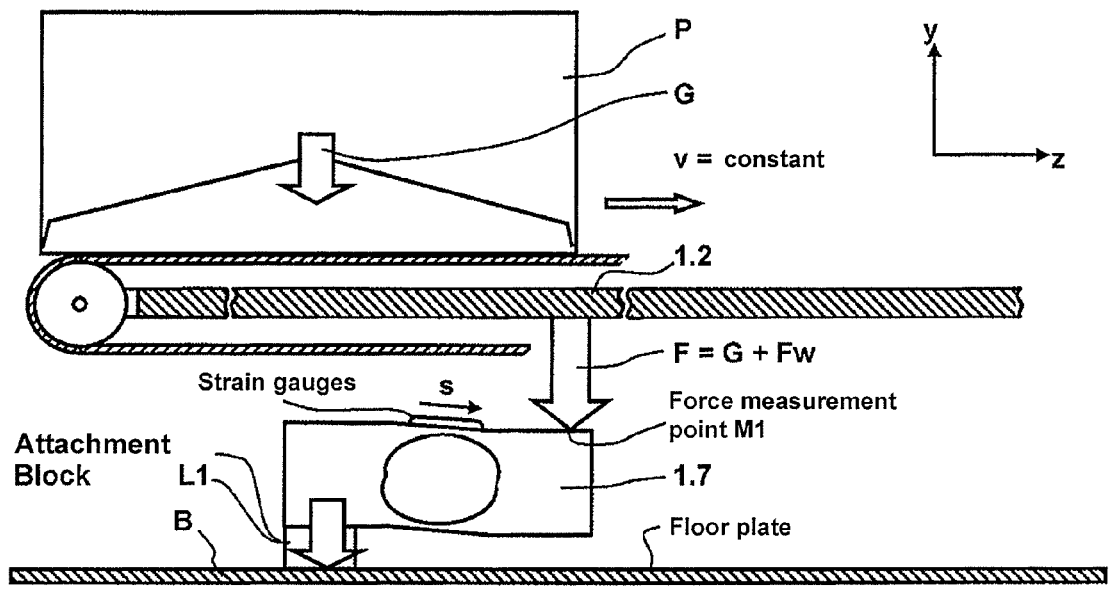
FIG. 2a is a basic presentation with a weighing cell and with a view of the x/y plane.

FIG. 2a shows a principle representation with the weighing cell with a view of the x/y plane. If a mail piece P is supplied standing on edge and is transported in the transport direction z with a constant velocity v, no additional forces other than gravity are to be considered. The equation $$F = m \cdot g = G + Fw \text{ with} \quad (1)$$

$$G = (m_p) \cdot g \text{ and} \quad (2)$$

$$Fw = (m_s + m_t) \cdot g \quad (3)$$

applies for the total active weight F, wherein g=9.81 m/s² is the acceleration in the gravitational field of the Earth. The mass m results from the mass $m_s$ of the weighing pan and the mass $m_t$ of the transport device, as well as the mass $m_p$ of the mail piece P. The equation $$G = F - F_w \quad (4)$$

also applies for the weight G of the mail piece, wherein $F_w$ is that weight of the weighing pan of the weighing unit and its transport device which act on the weighing cell 1.7 even when no good being weighed is supported on the weighing pan. The weight of at least the weighing pan of the weighing unit thus forms a pre-load.

The forces F or, respectively, $F_w$ act in the direction of gravity, i.e. counter to the y-direction, from the weighing pan 1.2 at the force measurement point M1 to introduce force into the weighing cell 1.7. The latter comprises a rigid and light bar that is produced from aluminum, for example. A platform weighing cell of the PW2D type by the company Hottinger Baldwin Messtechnik (HBM) is suitable as a weighing cell. Given a bar size of 31.4 mm×25.4 mm×130 mm, this allows a maximum platform size of the weighing pan 1.2 of 380 mm×380 mm given rated loads of Emax 7.2 kg, 12 kg or 18 kg, up to 72 kg.

An opening orthogonal to the x/y plane has been introduced, drilled, milled or shaped in a different manner into the Al bar. The weight $F_w$ of the weighing unit is already active, even if no mail piece is weighed. Due to the weight G of the mail piece, the force F produces a deformation of the Al bar of the weighing cell that is intensified in the thin regions by the central opening in said Al bar. The forces F or $F_w$ are transmitted via the Al bar to the attachment block L1 and from there to the floor plate B, wherein the Al bar is, however, stretched in the thin regions near the surface of the floor plate (x/z plane) and on the opposite measurement side in the s-direction. Strain gauges (DMS) which detect the expansion are glued onto the measurement side. The DMS have what is known as a "K-factor" which indicates the proportionality of the resistance change ΔR to the expansion ϵ.

Figure 2B:
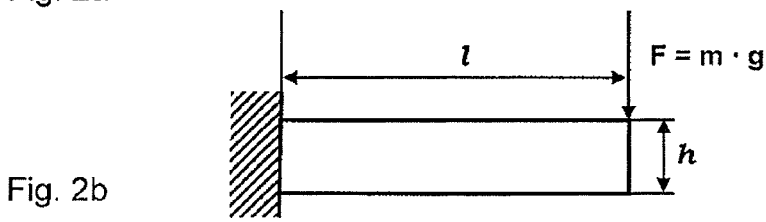
FIG. 2b shows an equivalent model of a mounted bar.

FIG. 2b shows an equivalent model of a tensioned bar of length/at whose end a force F acts in the direction of gravity. According to the equation, the bending moment in the region of the strain gauges in the middle of the bar amounts to $$M_b = F \cdot \tfrac{1}{2} \quad (5)$$

Figure 2C:
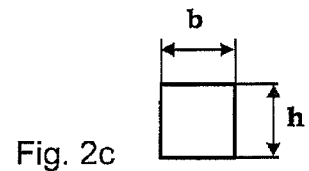
FIG. 2c shows cross section of the bar of FIG. 2b.

A cross section of the bar is shown in FIG. 2c. From this, and from Equation (6), with the equatorial resistance moment $W_e$-that is calculated as $$W_e = \frac{b \cdot h^2}{6} \quad (6)$$

from the cross section of the weighing cell with its width b and its height h at the point to be considered—a mechanical tension $$\sigma_b = \frac{M_b}{W_e} = \frac{6 \cdot M_b}{b \cdot h^2} = \frac{3 \cdot F \cdot l}{b \cdot h^2} \quad (7)$$

linked by means of Hooke's law, the tension σ and expansion ϵ over the modulus of elasticity E of the material $$\sigma = E \cdot \epsilon \quad (8)$$

thus results for the expansion measured directly by means of the DMS with the geometry and material data of the weighing cell and the introduced force $$\varepsilon = \frac{3 \cdot l}{b \cdot h^2} \cdot \frac{F}{E} \quad (9)$$

that results as a resistance change of the DMS according to the known DMS principle. The expansion $\varepsilon$ or contraction in the thin regions of the Al bar is transmitted to the DMS, and under the effect of the proportionality factor K a resistance change $\Delta R = \varepsilon \cdot K$ (which corresponds to the load change $F-F_w$) arises in the DMS. The change of the electrical resistance of the DMS that is caused by the expansion is evaluated by a suitable electronic measurement unit in order to determine the value of the weight G of the mail piece P.

Figure 2D:
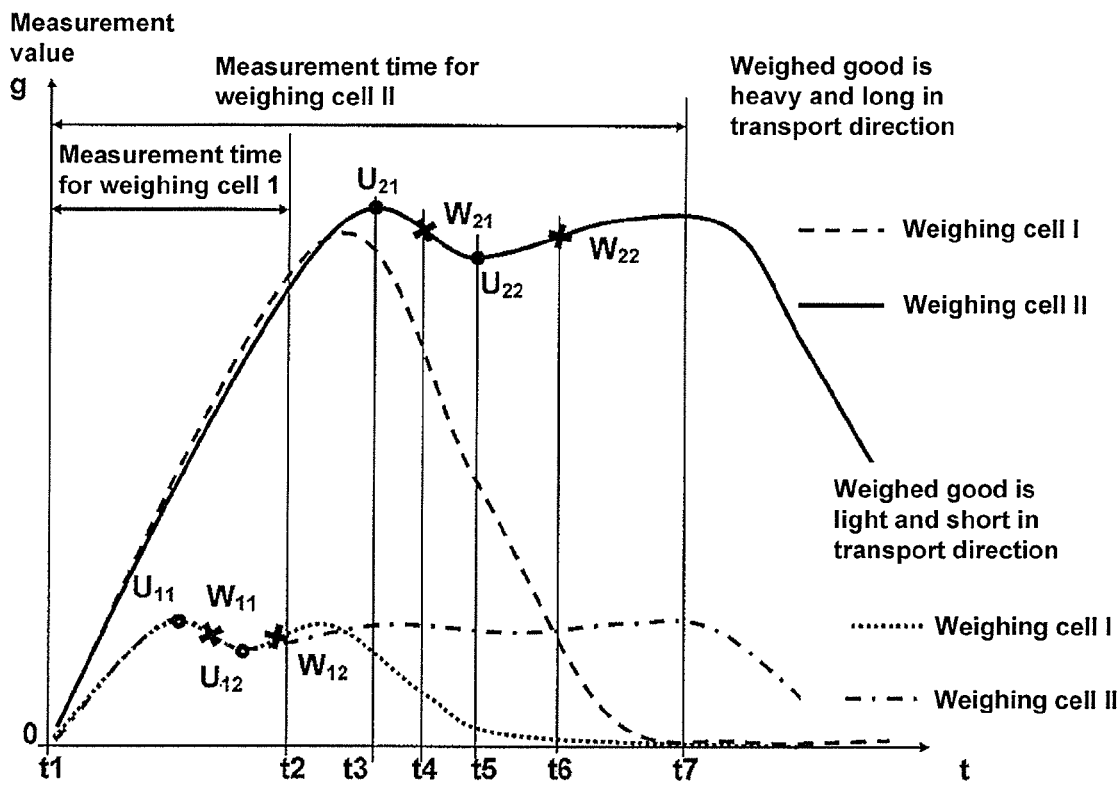
FIG. 2d-2e shows measurement curves of the weight value over time.
Figure 2E:
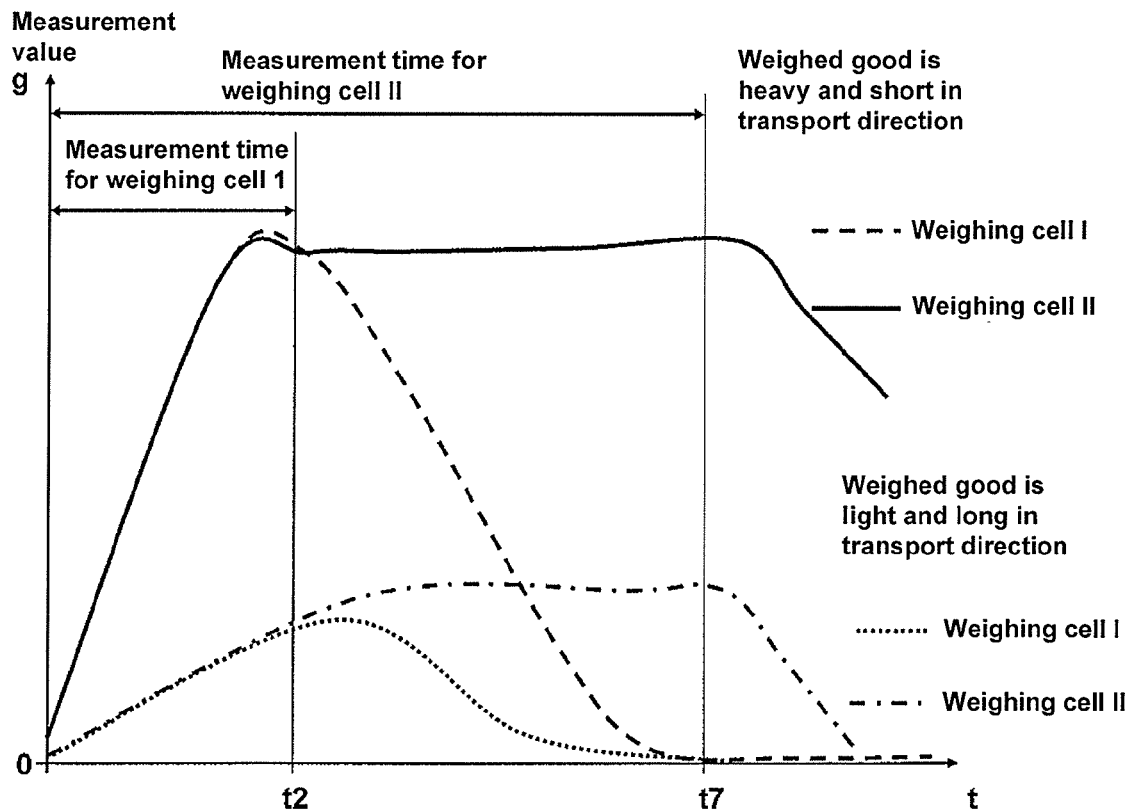

The measurement curves of the weight value over time is shown in FIGS. 2d and 2e. A dashed measurement curve applies for a weighed good that is heavy and long in the transport direction, for example mail pieces in DIN format C4 or B4 that have a letter length up to 353 mm. It is weighed dynamically with a first weighing cell I, wherein only a short measurement time t2–t1 is provided. The curve rises and then falls again without the weighing cell I outputting a stable signal. Given a stable signal, multiple measurement values exist for a measurement curve and the measurement curve has at least two inflection points $W_{21}$ and $W_{22}$ as well as two reversal points $U_{21}$ and $U_{22}$ after the rising part, as is illustrated using an additional measurement curve for the heavy and long weighed good that is drawn as a solid line and that is determined with a second weighing cell II, wherein a longer measurement time t7–t1 is provided, however. The curve rises, then remains relatively stable and then drops again. After the rise of the measurement curve, a first extreme value is reached. This is a local maximum that is reached at a point in time t3 and is designated here as a reversal point $U_{21}$. In the further course of time, the measurement curve changes its curvature at a first inflection point $W_{21}$ at the point in time t4 and reaches a second extreme value at the point in time t5. This is hereby a local minimum that here is designated as a reversal point $U_{22}$. The measurement curve subsequently changes its curvature again at a second inflection point $W_{22}$ at the point in time t6. The weight measurement can be concluded successfully via the measurement values remaining relatively stable in a narrow weight range of less than 5% of the weight of the weighed good between the reversal points $U_{21}$ and $U_{22}$.

Moreover, another two additional measurement curves for a weighed good that is light and short in the transport direction—for example mail pieces as long as the C6 DIN format that have a medium letter length of 229 mm—are shown in FIG. 2d. After the rise, the measurement curve changes into a right-hand bend at the first extreme value (local maximum) $U_{11}$ and then reaches a first inflection point $W_{11}$ in order to change into a left-hand bend. A second extreme value (local minimum) $U_{12}$ is then reached. In the further course of time, the measurement curve changes its curvature again at a second inflection point $W_{12}$. From the dotted measurement curve it is clear that the shorter measurement time t2–t1 for the first weighing cell I is already sufficient for a successful weight measurement. From the dash-dot measurement curve it is clear that the longer measurement time t7–t1 for the second weighing cell II is more than sufficient for a successful weight measurement. For post cards in the C6 DIN format (that can have a length of only 162 mm in the transport direction), an even shorter measurement time can be sufficient for a successful weight measurement.

Exceptional cases are shown in FIG. 2e, wherein the weighed good is heavy and short in the transport direction or light and long in the transport direction. Here a short measurement time is not sufficient; rather, only the weighing cell II delivers a stable signal given a longer measurement time.

Figure 3A:
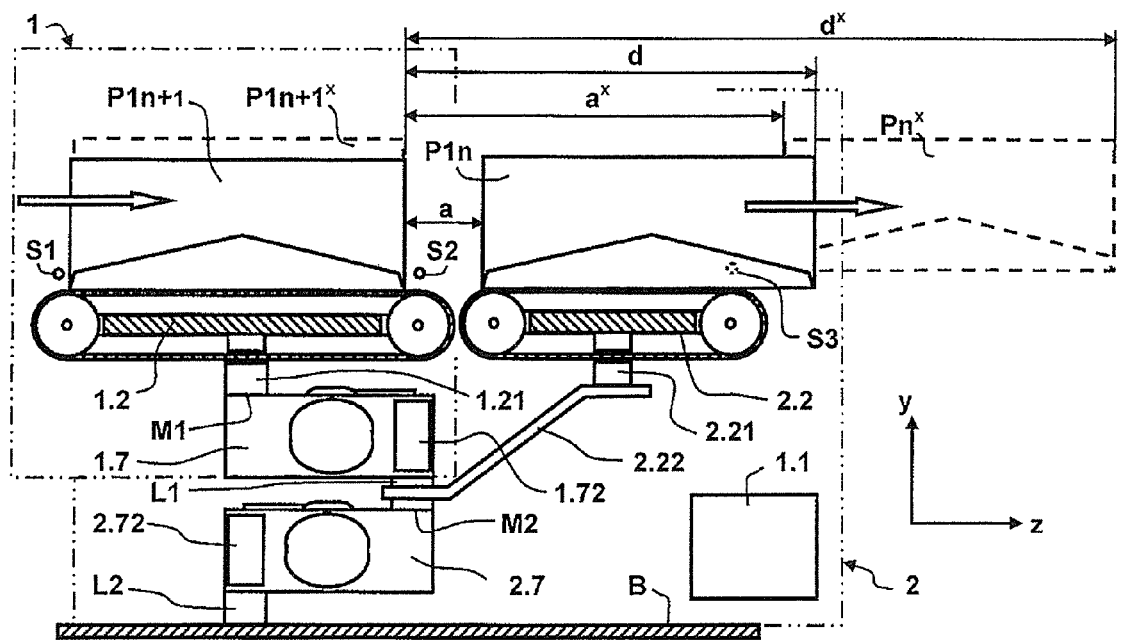
FIG. 3a shows an arrangement of two weighing pans and two weighing cells according to a first variant of the invention, in a view of the x/y plane upon feed of small-format mail pieces.

FIG. 3a shows an arrangement of two weighing pans and two weighing cells according to a first variant and with a view of the z/y plane upon feed of small-format mail pieces. Each weighing unit 1, 2 has a controller (not shown) with a connected weighing cell, sensors, an encoder (not shown) and a motor (not shown) to drive the transport device, wherein the encoder, motor and the transport device are arranged on the weighing pan of the dynamic scale (the manner is known but not shown). After a first, shortened weighing pan 1.2 in the transport direction z, a second weighing pan 2.2 is arranged in the transport direction z. The first weighing cell 1.7 is arranged directly below the first weighing pan 1.2, and the first weighing pan 1.2 is connected via a first force transmission block 1.21 with the force measurement point M1 of the first weighing cell 1.7. An attachment block L1 is attached at an attachment point (predetermined by the weighing cell manufacturer) of the first weighing cell, and is connected via a second force transmission block of a support 2.22 with the force measurement point M2 of the second weighing cell 2.7. The support 2.22 extends like an arm in the transport direction z and, at the end situated opposite the first weighing cell, has an adapter block 2.21 that is mechanically connected with the second weighing pan 2.2. The adapter block 2.21 of the second weighing cell 2.7 should be placed at a distance of not more than half the maximum platform size in the transport direction z from the attachment block L2 of said second weighing cell 2.7. The support 2.22 transmits a weight supplied by the second weighing pan 2.2 to the force measurement point M2 of the second weighing cell 2.7. The bar of the first weighing cell 1.7 also transmits a weight delivered by the first weighing pan 1.2 to the force measurement point M2 of the second weighing cell 2.7. The attachment block L2 is on the one hand firmly attached to an attachment point (predetermined by the weighing cell manufacturer) of the second weighing cell 2.7, and on the other hand is mechanically connected with the floor plate B. The adapter block 2.21 mechanically connected with the second weighing pan 2.2 is situated at a distance in the transport direction z from the attachment block L2 of the second weighing cell 2.7, and in fact at a further distance than that of the attachment block L2 of the second weighing cell 2.7 from the force injection block 1.21 mechanically connected with the first weighing pan 1.2. Both weighing cells can be of similar design.

However, a greater pre-load acts on the second weighing cell 2.7 than on the first weighing cell 1.7. A different segment in the total measurement range is thereby used by the second weighing cell 2.7 than by the first weighing cell 1.7. The first weighing cell 1.7 has an electromagnetically shielded space with an electronic measurement unit 1.72. The second weighing cell 2.7 also has an electromagnetically shielded space with an electronic measurement unit 2.72. The aforementioned electronic measurement units and sensors are electrically connected (the manner is not shown) with the controller (not shown) in order to receive measurement signals and in order to control the aforementioned electronic measurement units as necessary.

A mail piece P1n is shown standing on edge on the second weighing pan 2.2 and is transported in the transport direction z (white arrow). A subsequently supplied mail piece P1n+1 is likewise shown standing on edge on the first weighing pan 1.2 and is transported in the transport direction z (white arrow). The distance d between the leading edge of the mail piece P1n on the second weighing pan 2.2 and the leading edge of subsequently supplied mail piece P1n+1 which stands on the first weighing pan 1.2 is small relative to a distance $d^x$. The distance $d^x$ was drawn for comparison purposes and results given a known dynamic scale designed according to FIG. 1 with only one weighing unit. The throughput D of the dynamic scale results from the number of mail pieces per time unit. With a given transport velocity v and a distance d from leading edge to leading edge of the mail pieces P, it results according to the equation that:

$$D = v/d \quad (10)$$

A distance a between the trailing edge of the small-format mail piece P1n that is supported on the second weighing pan 2.2 and the leading edge of subsequently supplied small-format mail piece P1n−1 which is supported on the first weighing pan 1.2 is small relative to a distance $a^x$ that, in the case of the known dynamic scale designed according to FIG. 1 with only one weighing unit, would result between the trailing edge of the small-format mail piece P1$n^x$ (dashed) and the leading edge of subsequently supplied small-format mail piece P1$n+1^x$ (dashed). However, such a distance $a^x$ would also result if no second sensor S2 were present and a dynamic scale equipped with two weighing pans were operated further as before. The first weighing pan 1.2 shortened in the transport direction z and the second weighing pan 2.2 arranged in the transport direction z could yield a throughput increase only due to an additionally modified method to operate the dynamic scale. However, for this it is necessary that—in addition to a first sensor S1 at the upstream start of the transport device of the first weighing pan 1.2—a second sensor S2 is arranged at the downstream end of the device of the first weighing pan 1.2, and a third sensor S3 (shown in dashed line) is arranged near the downstream end of the transport device of the second weighing pan 2.2. The second sensor S2 signals an arrival of the leading edge of a supplied mail piece Pin, based on which the controller 1.1 checks whether the electronics 1.72 of the connected first weighing cell 1.7 delivers or has not yet delivered a stable signal.

The weight measurement was successful if the controller 1.1 establishes that the electronics 1.72 of the connected first weighing cell 1.7 delivers a stable signal. The mail piece P1n is transported further in the transport direction z and a subsequent mail piece P1n+1 is supplied to the first weighing pan 1.2. However, if the weight measurement was not successful, the third sensor S3 signals the arrival of the leading edge of a supplied mail piece P1n, whereupon the controller checks whether the electronics 2.72 of the connected second weighing cell 2.7 deliver or have not yet delivered a stable signal. If the controller establishes that the electronics 2.72 of the connected second weighing cell 2.7 deliver a stable signal, then the weight measurement with the second weighing cell 2.7 is successful. Otherwise, the mail piece is transported back and the system switches from dynamic weighing to a semi-dynamic weighing.

Figure 3B:
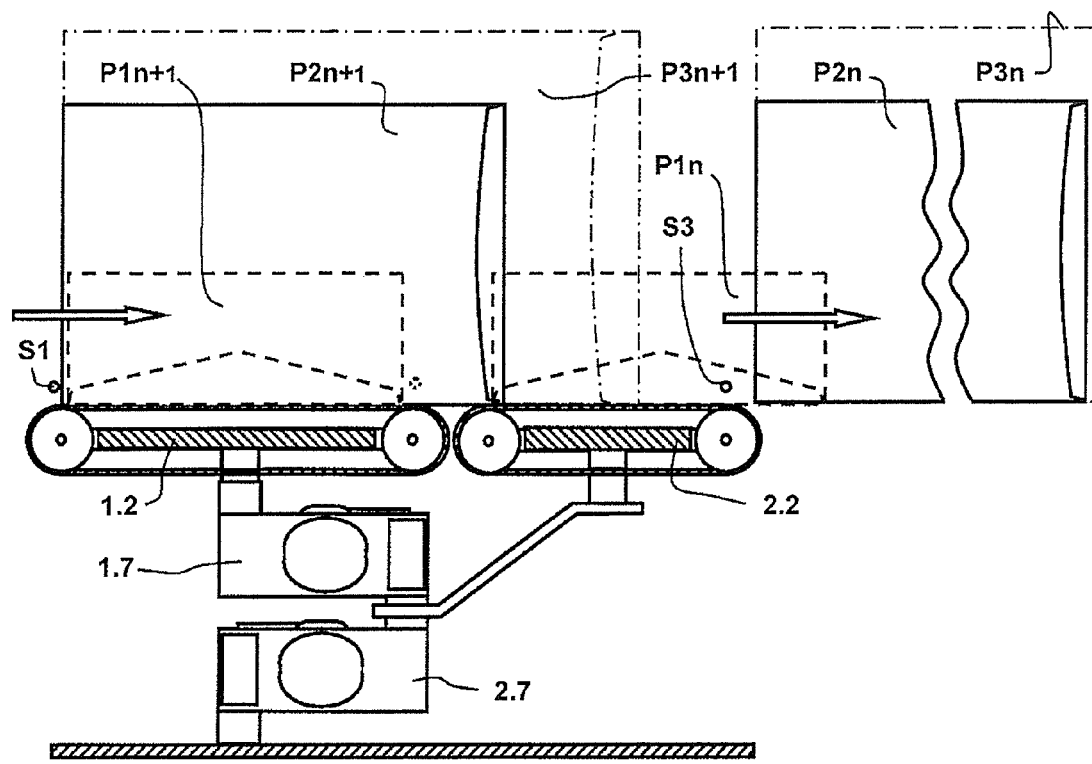
FIG. 3b shows an arrangement of two weighing pans and two weighing cells according to the first variant, in a view of the x/y plane upon feed of medium-format mail pieces.

FIG. 3b shows the arrangement of two weighing pans and two weighing cells according to the first variant and with a view of the z/y plane upon feed of medium-format mail pieces P2n and P2n+1 and large-format mail pieces P3n and P3n+1 (line-point-line). In comparison to the feed of small-format mail pieces (drawn in dashed lines) P1n and P1n+1, for which the aforementioned arrangement of the two weighing pans 1.2 and 2.2 and the overlapping arrangement of the two weighing cells 1.7 and 2.7 enables an increase of the throughput of mail pieces, no throughput increase results solely upon feeding medium-sized mail pieces P2n and P2n+1 or large-sized mail pieces P3n and P3n+1 to the dynamic scale because medium-format mail pieces only ever rest on both weighing pans after being supplied.

Figure 4:
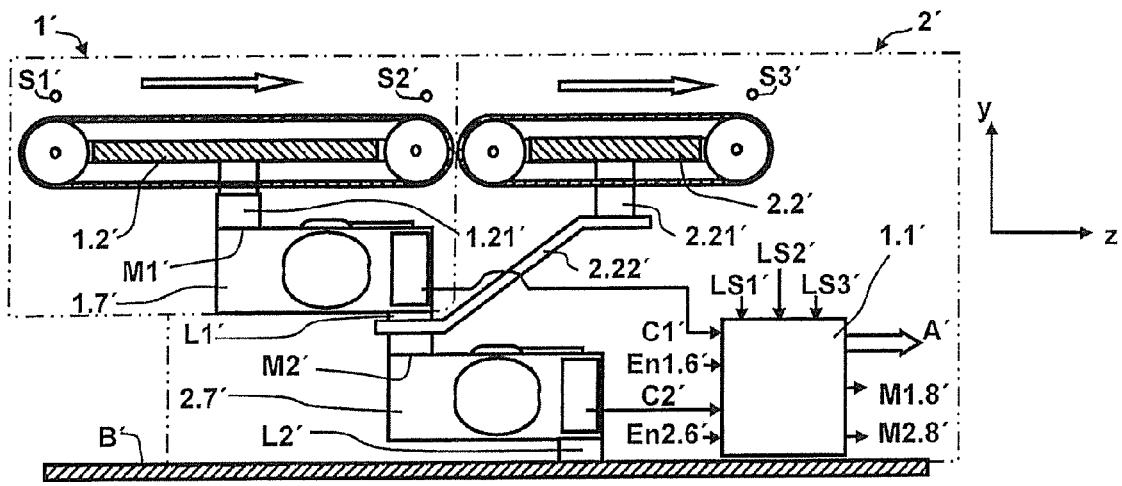
FIG. 4 shows an arrangement of two weighing pans and two weighing cells according to a second variant of the invention.

An arrangement of two weighing pans and two weighing cells according to a second variant is shown in FIG. 4, in which the two weighing pans 1.2' and 2.2' are arranged in the transport direction and the two weighing cells 1.7' and 2.7' are cascaded like a staircase, one atop the other. The sensors S1' and S2' as well as S3' are again arranged at the start and end of the transport device of the first weighing pan 1.2' and at the end of the transport device of the second weighing pan 2.2' in the transport direction z. A control unit 1.1' is electrically connected at its inputs via a line for a signal LS1' with the first sensors S1', and via a line for a signal LS2' with the second sensor S2', and via a line for a signal LS3' with the third sensor S3'. (the manner is not shown) The control unit 1.1' also is connected via lines for the signals En1.6' and En2.6' with the encoder (not shown) of the transport device of the weighing pan 1.2' of the first weighing unit, and with the encoder (not shown) of the transport device of the weighing pan 2.2' of the second weighing unit. The control unit 1.1' is electrically connected at its outputs (the manner is not shown) via lines for the signals M1.8' and M2.8' with a first motor (not shown) of the transport device of the weighing pan 1.2' of the first weighing unit and a second motor (not shown) of the transport device of the weighing pan 2.2' of the second weighing unit. The control unit 1.1' is electrically connected at its inputs via lines for the measurement signals C1' and C2' with the first weighing cell 1.7' and with the second weighing cell 2.7', and at its output side outputs a digital output signal A' with the measured weight value of the weighed good.

Arranged after the first weighing pan 1.2' shortened in the transport direction z is the second weighing pan 2.2' in the transport direction z. The first weighing pan 1.7' is arranged directly below the first weighing pan 1.2', and the first weighing pan 1.2' is connected via a first force transmission block 1.21' with the force measurement point M1' of the first weighing cell 1.7'. An attachment block L1' is connected on the one hand to an attachment point (predetermined by the weighing cell manufacturer) of the first weighing cell 1.7' and on the other hand via a second force transmission block of a support 2.22' with the force measurement point M2' of the second weighing cell 2.7'. The support 2.22' extends as an arm in the transport direction z and has at an opposite end an adapter block 2.21' that is mechanically connected with the second weighing pan 2.2'. An attachment block L2' is mechanically connected on the one hand to an attachment point (predetermined by the weighing cell manufacturer) of the second weighing cell 2.7' and on the other hand with the floor plate B'. Starting from the force measurement point M2' of the second weighing cell 2.7', the bar of the first weighing cell 1.7' extends like an arm in the direction opposite the transport direction z. The attachment block L2' of the second weighing cell 2.7' is thus spaced in the transport direction z from the first force transmission block 1.21' mechanically connected with the first weighing pan 1.2', and is distanced further than the adapter block 2.21' mechanically connected with the second weighing pan 2.2' is from the attachment block L2' of the second weighing cell 2.7'. The dimension of the first weighing pan 1.2' is shortened relative to the maximum possible platform size, corresponding to the dimension of the small-format mail piece in the transport direction z. The attachment block L2' of the second weighing cell 2.7' should be spaced no more than half of the maximum platform size from the first force transmission block 1.21' in the transport direction z.

The weighing pan of the known dynamic scale according to FIG. 1 is already dimensioned as a whole in its measurement in the transport direction z for a high throughput of large-format mail pieces P3$n$ and P3$n$+1. By an arrangement of a first weighing unit 1, 1' and a second weighing unit 2, 2' according to a first variant according to FIGS. 3$a$, 3$b$ or according to a second variant according to FIG. 4, the dynamic scale was also dimensioned for high throughput of small-format mail pieces P1$n$ and P1$n$+1 or P1$n$' and P1$n$+1' in that the weighing pans 1.2, 2.2 or 1.2', 2.2 of the weighing units are executed shortened in the transport direction z and adjacent to one another, and are arranged in the same upper plane. An embodiment variant that also enables an increase of the throughput of medium-format mail pieces was now achieved with FIG. 5.

Figure 5:
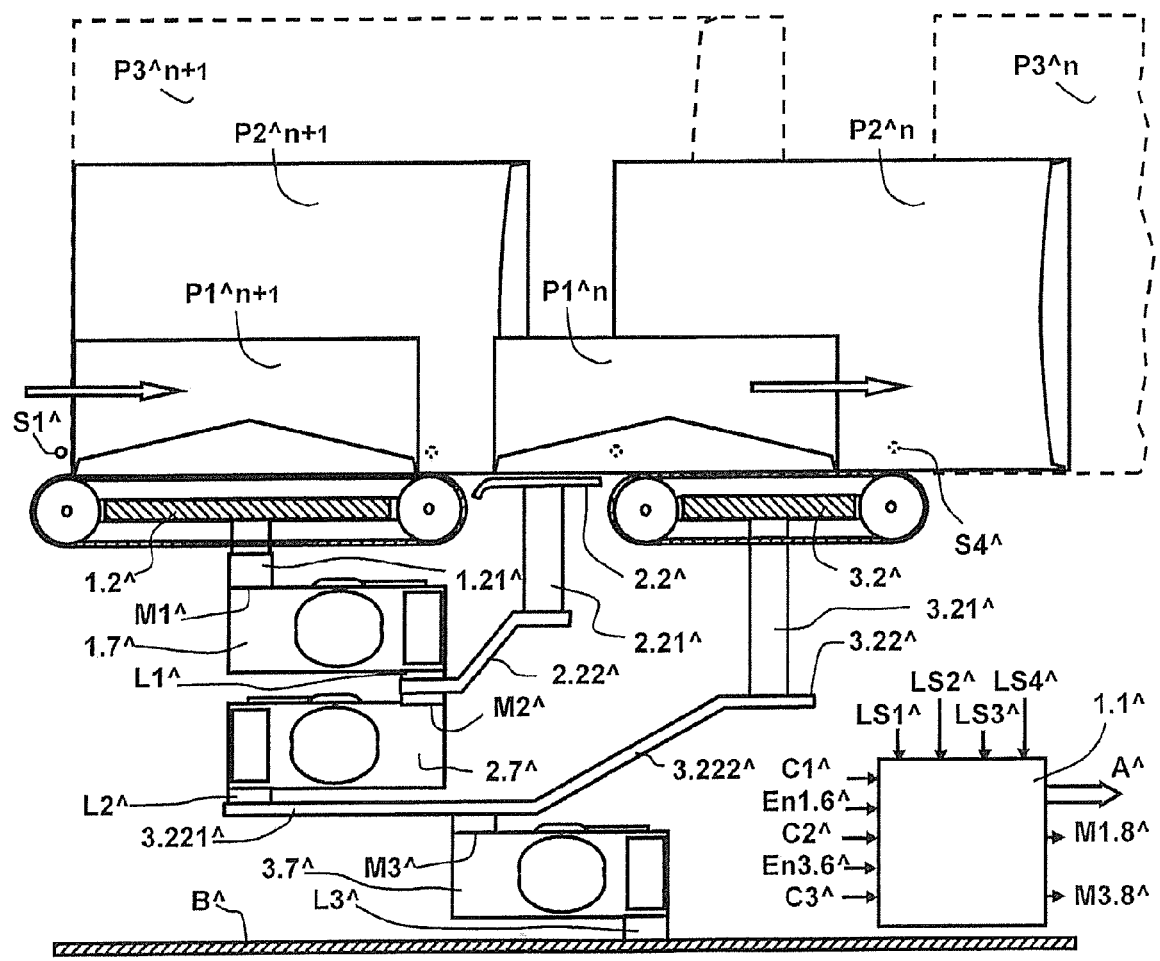
FIG. 5 shows an arrangement of two weighing pans and two weighing cells according to a third variant of the invention.

An arrangement of three weighing pans and three weighing cells according to a third variant is shown in FIG. 5. A second weighing pan 2.2^ shortened in the transport direction z is arranged after the first weighing pan 1.2^ shortened in the transport direction z, and arranged after said second weighing pan 2.2^ is a third weighing pan 3.2^ shortened in the transport direction z. At least four sensors S1^ to S4^ are used. The first and third weighing pan 1.2^ and 3.2^ respectively have a transport device. However, the second weighing pan 2.2^ has no transport device and is arranged between the first and third weighing pan 1.2^ and 3.2^. The first weighing cell 1.7^ is arranged like a tower above the second weighing cell 2.7^, but the second weighing cell 2.7^ is arranged overlapping the third weighing cell 3.7^ like a staircase. The force transmission block 1.21^ mechanically connected with the first weighing pan 1.2^ is further removed from the attachment block L3^ of the third weighing cell 3.7^ in a direction opposite the transport direction z than from the force transmission block 2.21^ mechanically connected with the second weighing pan 2.2^. The force transmission block 3.21^ mechanically connected with the third weighing pan 3.2^ is further removed in the transport direction z from the attachment block L2^ of the second weighing cell 2.7^ than from the attachment block L3^ of the third weighing cell 3.7^. The first weighing cell 1.7^ is arranged directly below the first weighing pan 1.2^, and the force transmission block 1.21^ acts on the force measurement point M1^ of the first weighing cell 1.7^. The attachment block L1^ is connected on the one hand with the first weighing cell 1.7^ and on the other hand via a force transmission block of a support 2.22^ with the force measurement point M2^ of the second weighing cell 2.7^. The support 2.22^ has at its opposite end a force transmission block 2.21^ that is mechanically connected with the second weighing pan 2.2^. The bar of the first weighing cell 1.7 transmits the weight introduced by the first weighing pan 1.2^ to the force measurement point M2^ of the second weighing cell 2.7^, even when the allowable weight measurement range of the first weighing cell 1.7^ is exceeded by the mail piece P2^$n$+1 transported, standing on edge, across the first weighing pan 1.2^. The support 2.22^ likewise transmits the weight introduced by the second weighing pan 2.2^ to the force measurement point M2^ of the second weight cell 2.7^. A medium-format mail piece which is supported during the transport on the first weighing pan 1.2^ and the second weighing pan 2.2^ can thus be weighed by means of the second weighing cell 2.7^.

An attachment block L2^ is connected on the one hand with the second weighing cell 2.7^ and on the other hand via a force transmission block of an additional support 3.22^ with the force measurement point M3^ of the third weighing cell 3.7^ whose attachment block L3^ is mechanically connected with the floor plate B^. The additional support 3.22^ has at its opposite end the force transmission block 3.21^ that is mechanically connected with the third weighing pan 3.2^. The bar of the second weighing cell 2.7^ transmits the weight of the mail piece (transmitted by the first weighing pan 1.2^ and second weighing pan 2.2^) and the weight incurred by the first and second weighing unit via a section 3.221^ of the additional support 3.22^ to the force measurement point M3^ of the third weighing cell 3.7^, even when the allowable weight measurement range of the second weighing cell 2.7^ is exceeded by the mail piece P2^$n$+1 transported, standing on edge, across the second weighing pan 2.2^. A second segment 3.222^ of the additional support 3.22^ likewise transmits the weight introduced by the second weighing pan 3.2^ to the force measurement point M3^ of the third weighing cell 3.7^. A large-format mail piece which is supported on the first weighing pan 1.2^, second weighing pan 2.2^ and third weighing pan 3.2^ during the transport can thus be weighed by means of the third weighing cell 3.7^.

The sensors S1^ and S2^ as well as S3^ and S4^ are respectively arranged again at the start and end of the transport device of the first weighing pan 1.2^ and at the start and end of the transport device of the third weighing pan 3.2^, in the transport direction z. The sensors S2^, S3^ and S4^ drawn in dashed lines are occluded by mail pieces. The mail pieces P1^$n$ and P1^$n$+1 are small-format. The mail pieces P2^$n$ and P2^$n$+1 are medium-format and the mail pieces P3^$n$ and P3^$n$+1 are large-format. A throughput increase is thus likewise achievable given medium-format mail pieces, and therefore in the entire mixed mail range, due to the second weighing pan 2.2^ shortened in the transport direction z.

The fourth sensor S4^ is arranged near the downstream end of the transport device of the weighing pan 3.2^ of the third weighing unit 3^, and a control unit 1.1^ is electrically connected at its input on the one hand (the manner is not shown) with the first sensor S1^ via a line for a signal LS1^; with the second sensor S2^ via a line for a signal LS2^; with the third sensor S3^ via a line for a signal LS3^; with the fourth sensor S4^ via a line for a signal LS4^ the control unit 1.1" is connected (the manner is not shown) via lines for the signals En1.6^ and En3.6^ with the encoder (not shown) of the transport device of the weighing pan 1.2^ of the first weighing unit and with the encoder (not shown) of the transport device of the weighing pan 3.2^ of the third weighing unit. The control unit 1.1" is electrically connected at its output (the manner is not shown) via lines for the signals M1.8^ and M3.8^ with a first motor of the transport device of the weighing pan 1.2^ of the first weighing unit and a third motor of the transport device of the weighing pan 3.2^ of the third weighing unit.

Figure 8:
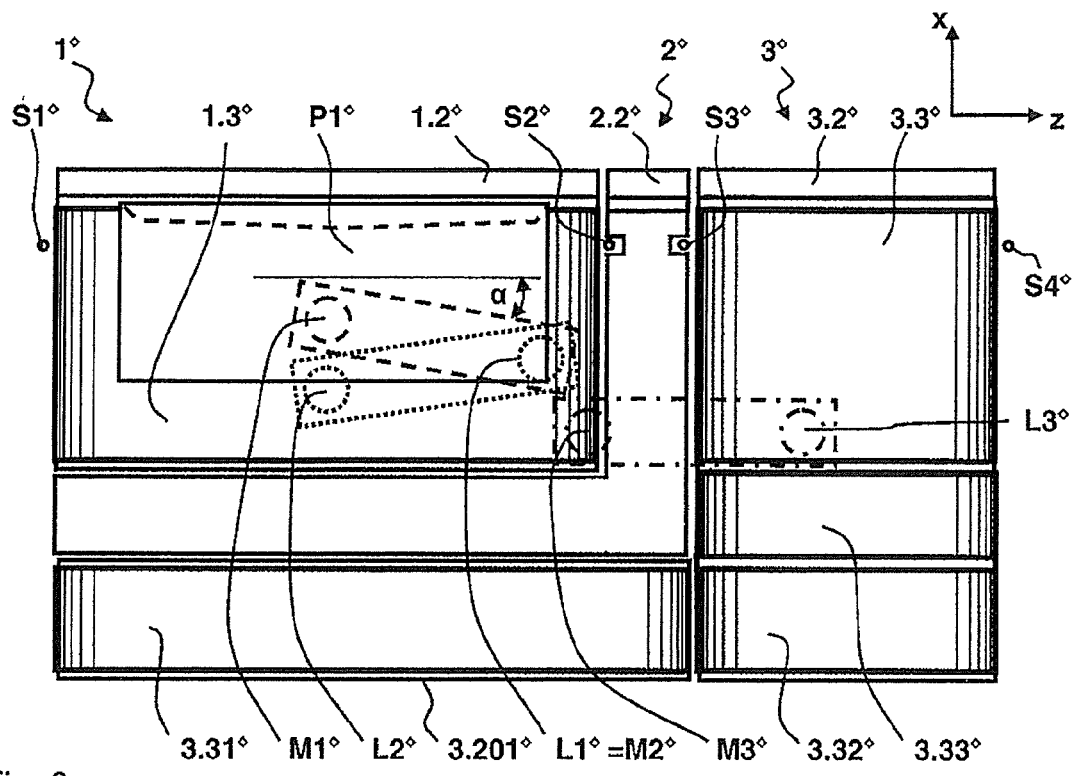
FIG. 8 shows an arrangement of transport devices for three weighing pans according to a fifth variant of the invention, in a view of the x/y plane given feed of small-format mail pieces.

The control unit 1.1^ is electrically connected at its input with the weighing cell 1.7^, with the second weighing cell 2.7^ and with the third weighing cell 3.7^ via lines for the measurement signals C1^, C2^ and C3^; and outputs at its output a digital output signal A^ with the measured weigh value of the weighed good. The same circuit arrangement is also provided for the arrangement according to a fifth variant that is shown in FIG. 8.

While weighing cells of essentially identical design and with the same rated load (for example for a maximum weight G=18 kg) are used in the first, second and fourth variant, in the exemplary embodiment according to the third or fifth variant weighing cells of the same design and with different rated loads (for example for the maximum weights G=7.5 kg, G=12 kg and G=18 kg) can also be used. The first weighing cell can be designed with the lowest rated load G=7.5 kg, and the third weighing cell can be designed with a higher rated load G=18 kg. However, this requires an overload safeguard in all directions for at least the first weighing cell, which is not shown, for clarity.

Figure 6:
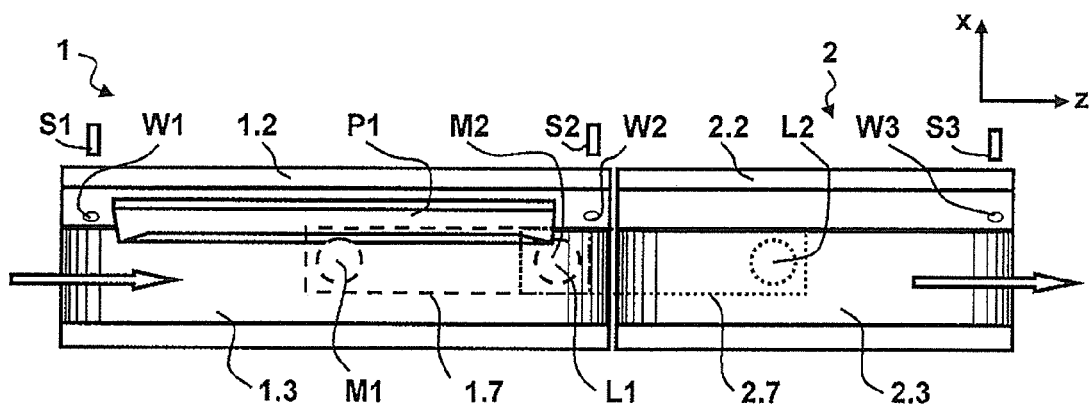
FIG. 6 shows an arrangement of transport devices of a dynamic scale according to the first variant, in a view of the x/z plane given feed of small-format mail pieces.

FIG. 6 shows the arrangement of transport devices of a dynamic scale 1 according to the first variant and with a view of the x/z plane given feed of a small-format mail piece P1 that, supplied standing on edge, is transported along in the transport direction z (white arrow) during the weighing by means of the transport belt 1.3 of the transport device. The first weighing pan 1.2 has a side wall angled 18° (for example) relative to vertical, which side wall extends parallel to the back side of the dynamic scale and on which the mail piece P1 rests. The side wall has window openings W1 and W2 formed for the sensors S1 and S2. A window opening W3 formed in a side wall of the second weighing pan 2.2 is provided for the third sensor S3 arranged downstream in the mail flow. The first weighing cell 1.7 (not visible from above) is drawn in dashed lines below the transport belt 1.3 of a transport device of the first weighing pan 1.2 in order to clarify its position. Its force measurement point M1 is situated centrally under the first weighing pan 1.2, and its attachment block L1 lies in proximity to the downstream end of the first weighing pan 1.2 and is mechanically connected directly with the force measurement point M2 of the second weighing cell 2.7. The second weighing cell 2.7 (not visible from above) is drawn in dashed lines below the transport belt 2.3 of a transport device of the second weighing pan 2.2 in order to clarify its position. Its attachment block L2 lies in proximity to center of the second weighing pan 2.2. The arrangement of the two weighing cells is essentially parallel to the transport direction z.

Figure 7A:
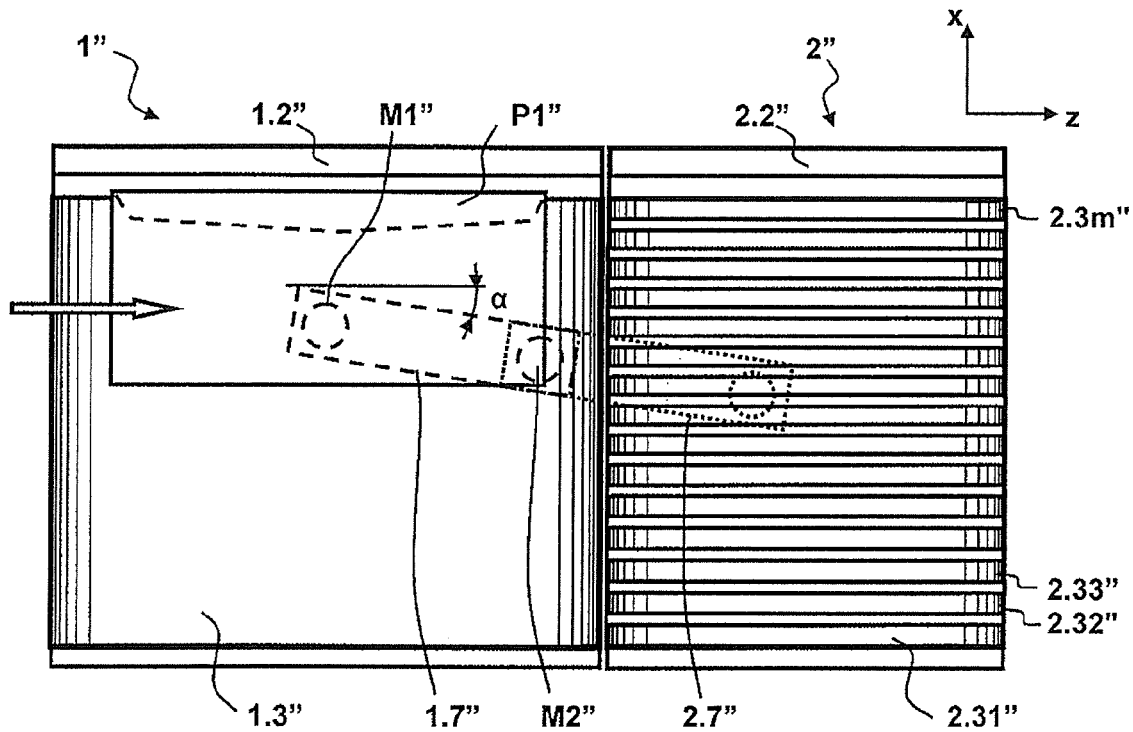
FIG. 7a shows an arrangement of transport devices of a dynamic scale according to the first variant, in a view of the x/y plane given feed of small-format mail pieces.

FIG. 7a shows the arrangement of transport devices of a dynamic scale 1" according to a fourth variant and with a view of the x/z plane given feed of a small-format mail piece P1' that, lying on its back side, was supplied to the first weighing pan 1.2" and is transported further in the transport direction z (white arrow) by means of the transport belt 1.30" of the transport device during the weighing. The first weighing cell 1.7" (not visible from above) is drawn in dashed lines below the transport belt 1.3" of the transport device of the first weighing pan 1.2" in order to illustrate its position. Its force measurement point M1 lies near the middle of the small-format mail piece P1" that is transported by the transport belt 1.3" of the first weighing pan 1.2". The attachment block L1" of the first weighing cell 1.7" lies close to the downstream end of the first weighing pan 1.2" and is directly mechanically connected with the force measurement point M2" of the second weighing cell 2.7". The second weighing cell 2.7" (not visible from above) is drawn in dashed lines below the transport device of the second weighing pan 2.2" in order to clarify its position. Its attachment block L2" lies close to the middle of the second weighing pan 2.2". The arrangement of the two weighing cells pointing in the direction of the force measurement point M1 at the attachment block L2" of the second weighing cell 2.7" encloses an acute angle α with transport direction z. As an alternative to this, an angle as of the force measurement point M2" of the second weighing cell 2.7" can also be provided that is different than the angle α, wherein the angle is selected depending on the technical data of the weighing cells, including the maximum platform size and the load limit provided by the manufacturer given maximum eccentricity and the dimensions of the mail pieces. Given mail pieces lying on a side, it is advantageous if a relatively wide transport belt 1.3" is subdivided (the manner is not shown) like the transport belt 2.3" into a plurality of narrow transport belts 2.31", 2.32", 2.33" through 2.3m", wherein the narrow transport belts are arranged adjacently in the y-direction.

Figure 7B:
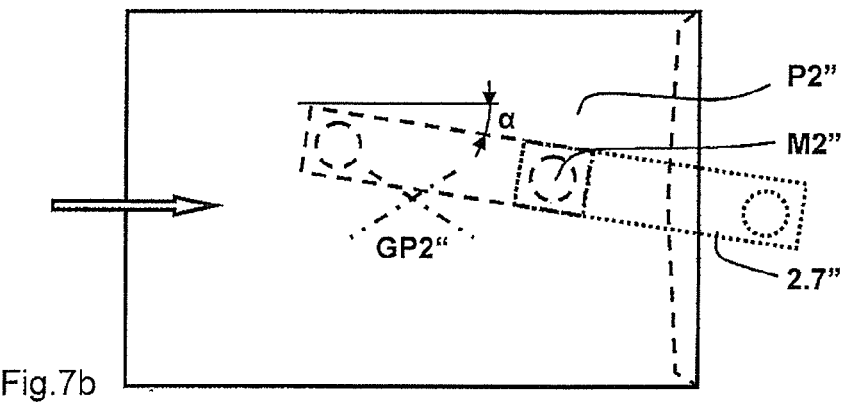
FIG. 7b is a view of the x/z plane given feed of medium-format mail pieces.

FIG. 7b provides a view of the x/z plane given feed of a medium-format mail piece P2" that was supplied lying on its back side. Given transport of a medium-format mail piece in the transport direction (white arrow), its center of gravity GP2" arrives over the force measurement point M2" of the second weighing cell 2.7".

FIG. 8 shows the arrangement of transport devices for three weighing pans 1.2◇ 2.2◇ and 3.2◇ according to a fifth variant with sensors S1◇, S2◇, S3◇, S4◇ and with weighing pans 1.2◇, 2.2◇, 3.2◇, and with a view of the x/z plane given feed of small-format mail pieces P1◇. The first weighing pan 1.2◇ and the third weighing pan 3.2◇ have transport belts 1.3◇ and 3.3◇, 3.31◇, 3.32◇, 3.33◇ of different widths and lengths. An additional sub-weighing pan 3.201◇ that bears the transport belt 3.31◇ can alternatively be installed at the third weighing pan 3.2◇. Only the second weighing pan 2.2◇ does not require a transport belt, and it is designed as a plate-shaped angled piece.

As an alternative, a relatively wide transport belt can again be subdivided (the manner is not shown) into a number of narrow transport belts, wherein the narrow transport belts are arranged adjacently in the y-direction.

The arrangement of the first weighing cell (broken line) in the arrangement according to FIG. 8 has been made in an area between the force measurement point M1◇ and the attachment block L1◇ and lies in the x/z-plane at an angle α, as was shown in FIG. 7. The angle as of the force measurement point M2◇ relative to the attachment block L2◇ of the second weighing cell 2.7◇ (dotted line) is provided differently than the angle α, which is shown in the x/z-plane wherein the respective angle is selected depending on the technical data of the weighing cells and the format of the weighed good. The arrangement of the third weighing cell (line-dot-line) has been made in an area between the force measurement point M3◇ and the attachment block L3◇ and lies essentially parallel to the transport direction z, wherein a support (not shown) produces the required force coupling between the second and third weighing cell.

As an alternative, for a different purpose the arrangement of the three weighing cells can also be aligned angled differently relative to one another and to the transport direction z.

Figure 9:
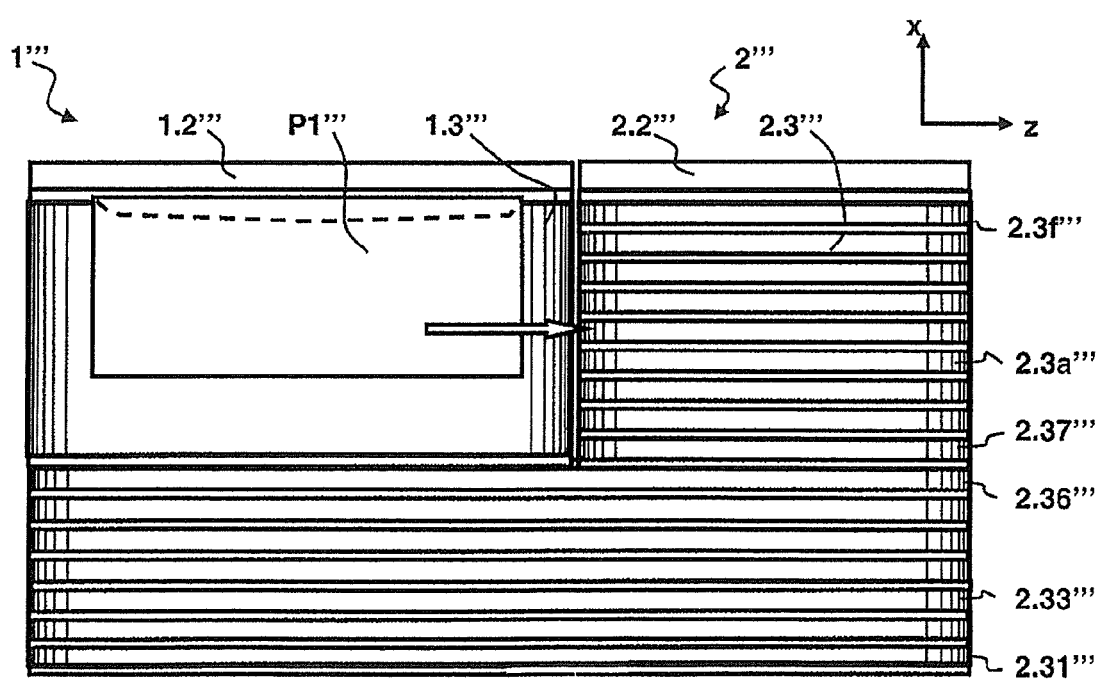
FIG. 9 shows arrangement of transport devices for two weighing pans according to a sixth variant of the invention, in a view of the x/y plane given feed of small-format mail pieces.

FIG. 9 shows the arrangement of transport devices for two weighing pans 1.2''' and 2.2''' according to a sixth variant, and with a view of the x/z plane given feed of small-format mail pieces P₁" that, resting on their back side, were supplied to the first weighing pan 1.2''' and transported further in the transport direction z (white arrow) by means of the transport belt 1.3''' of the transport device during the weighing. A relatively wide transport belt 1.3''' can be subdivided (the manner is not shown) like the transport belt 2.3''' into a plurality of narrow transport belts 2.31''',..., 2.33''' through 2.3f''', wherein the narrow transport belts 2.31''',..., 2.33''' through 2.36''' are designed to be longer in the transport direction z than the narrow transport belts 2.37''',..., 2.3a''' through 2.3f'''.

A different design for other weighed goods is also possible as an alternative. Means for an alternative design of the transport device can also be used.

The measurement results of the second weighing cell can be used for a plausibility check of the results of the first weighing cell. An averaging of the results of both weighing cells is likewise conceivable as long as the mail piece is not located on only the weighing pan of the first weighing unit. The measurement results of a third or n-th weighing cell can be used for a plausibility check of the results of the second or (n−1) th weighing cell.

Figure 10:
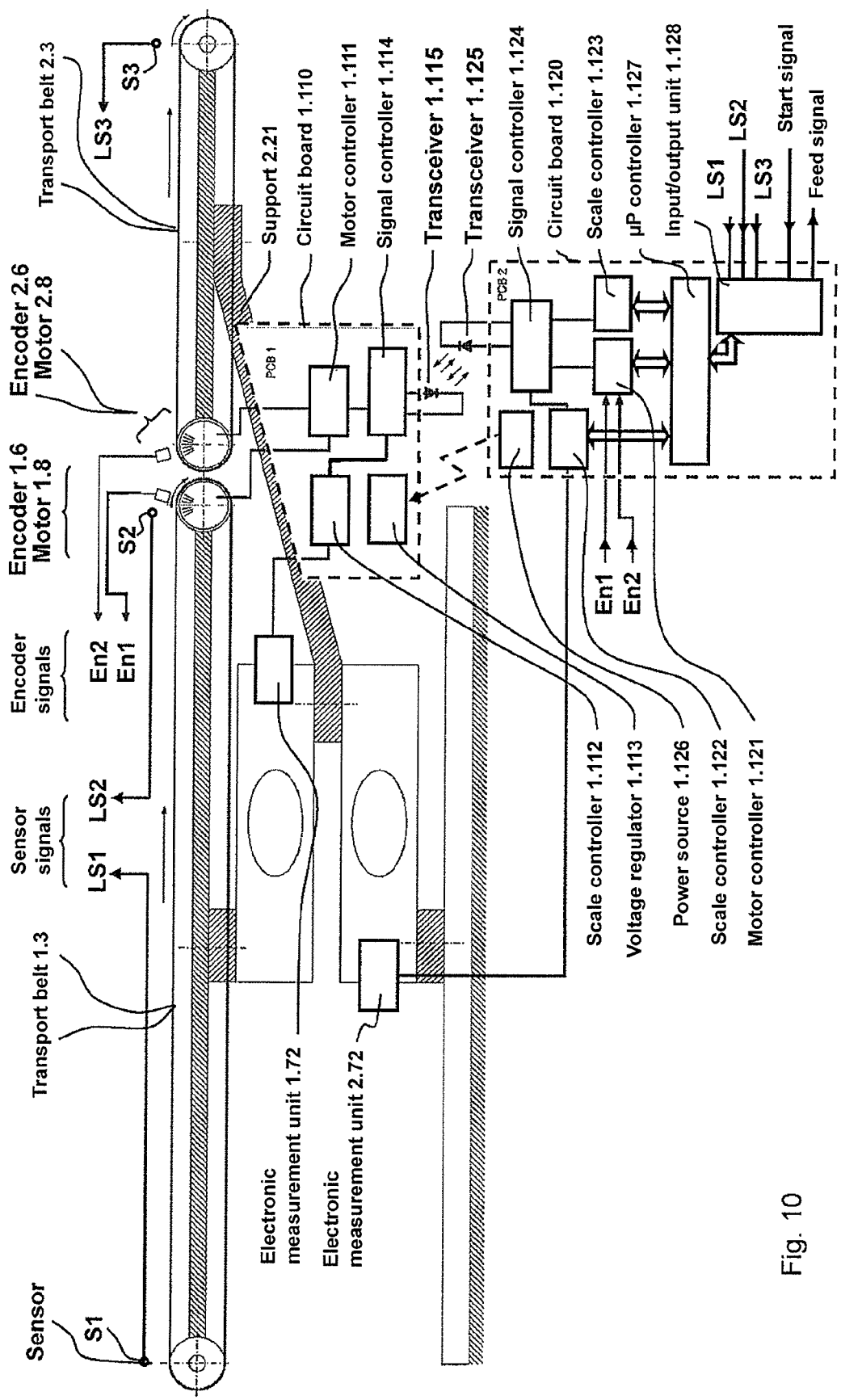
FIG. 10 is a block diagram of a dynamic scale with multiple weighing pans according to the invention.

A block diagram of a dynamic scale with multiple weighing pans is [shown] in FIG. 10. Installed at the first weighing pan is a transport device which has a first encoder 1.6; a first motor 1.8; deflection rollers; and additional means (not shown) for directing, tightening and aligning a first transport belt 1.3. The first weighing cell is operated with a different pre-load, and possibly has a different rated load relative to the second weighing cell. So that the weighings are not too severely distorted by the components that are weighed concurrently, the number of mechanical connections between the unweighed components (standing on the floor plate) and the weighed components is minimized in that a first control board 1.110 that is only concurrently weighed by the second weighing cell is mounted on the support 2.21 that accepts the second weighing pan and the transport device installed on this. The first control board 1.110 is mounted at an installation point which, due to the selection of the installation point, allows brief electrical connections to activate the first motor 1.8 and to receive the measurement signals from the first weighing cell. The transport device installed at the second weighing pan has a second encoder 2.6; a second motor 2.8; deflection rollers; and additional means (not shown) to direct, tighten and align a second transport belt 2.3.

The outputs of an electronic measurement unit 1.72 of the first weighing cell are connected with the measurement signal inputs of a scale controller 1.112 of the first control board 1.110. The electronic measurement unit 1.72 of the first weighing cell is fed with a direct voltage by the first control board 1.110.

Via a cable, a motor controller 1.111 of the first control board 1.110 has both an electrical connection to control the first motor 1.8 and an electrical connection to control the second motor 2.8.

For their activation, the scale controller 1.112 and the motor controller 1.111 are connected with a signal controller 1.114 of the first control board 1.110.

The signal controller 1.114 of the first control board 1.110 on the other serves to transmit the measurement signals via a first transceiver 1.115 to transceiver 1.125 of a second control board 1.120.

The first control board 1.110 is supplied (the manner is not shown) via a regulated direct voltage that is delivered unregulated from a first power source 1.126 (which is arranged external to the first control board 1.110), for example via two supply wires to a voltage regulator 1.113 of the first control board 1.110. At the first control board 1.110, this unregulated direct voltage is converted into a regulated direct voltage to supply the first weighing cell and the first motor controller 1.111 to control the motors 1.8 and 2.8.

The first power source 1.126 is a component of a second control board 1.120 and also delivers a regulated direct voltage to additional modules.

The control board comprises at least one microprocessor controller 1.127; an input/output unit 1.128; a second scale controller 1.122; a third scale controller 1.123; a motor controller 1.121; and a signal controller 1.124. Connected to the signal controller 1.124 of the second control board 1.120 is a second transceiver 1.125 that has a communication connection with the first transceiver 1.115 of the first control board 1.110.

The outputs of an electronic measurement unit 2.72 of the second weighing cell are connected with the measurement signal inputs of the second scale controller 1.122 of the second control board 1.120. The electronic measurement unit 2.72 of the second weighing cell is fed with a direct voltage by the second control board 1.120.

The second scale controller 1.122, the third scale controller 1.123 and the motor controller 1.1211 are connected with the second signal controller 1.124 in terms of control and measurement signals.

The outputs of the two encoders 1.6 and 2.6 are connected to the inputs of the second motor controller 1.211 via electrical connection lines for the signals En1 and En2.

Electrical connection lines for a start signal and for the signals LS1, LS2 and LS3 from the outputs of the sensors S1, S2 and S3 are connected to the inputs of the input/output unit 1.128. Electrical connection lines for a feed signal to be transferred to the automatic feed station are connected to an output of the input/output unit.

The weighing signals and information regarding the motor control are transferred optically (via infrared, for example) via transceivers from the signal controller 1.114 of the first control board 1.110 and to the signal controller 1.124 of the second control board 1.120.

The first motor controller 1.111 of the first control board 1.110 processes the supply voltage and the control information regarding matching control voltages for the two motors 1.8 and 2.8. The calculation of the control information takes place by means of the second motor controller 1.121 in a control loop via evaluation of the encoder signals En1 and En2 of the second motor controller 1.121 that are associated with the two motors.

While the activation of the first weighing cell likewise takes place at the first control board 1.110, the activation of the second weighing cell takes place via the second scale controller 1.122 of the second circuit board 1.120. The microprocessor controller 1.127 forms a superordinate logic for the weighing electronics of the control boards 1.110 and 1.120. This executes the overall control and overall evaluations of the weighing units. Depending on light barrier signals that are delivered by the sensors and are triggered by the weighed good upon its arrival at predetermined positions, weighing processes are started with this and determined weighing results are requested and processed further. Furthermore, the adjustment of weighing parameters is controlled via the superordinate logic. The motor, scale and signal controllers of the control boards 1.110 and 1.120 receive and send signals. They provide for the identification and transmission of motor control signals and weighing control signals that takes place between the control boards 1.110 and 1.120 by means of transceivers, advantageously optical transmitters and receivers.

Alternatively, transceivers for radio or inductive transmission or for another type of wireless transmission can also be used.

Given an arrangement of the weighing cells functionally cascaded in the direction of gravity, an alternative, partial arrangement of the weighing cells next to one another can be provided in which the design of the weighing pans and supports ensure that the forces emanating from the weighing pans in the direction of gravity additively overlap in a desired manner before these act on a weighing cell. The largest forces act on the weighing cell installed on the floor plate, inherently due to the higher pre-load. The oscillation period of the last weighing pan in the transport path is thereby increased relative to the oscillation period of the first weighing pan in the transport path. This is advantageously used to eliminate interferences due to shocks. The weight measurements simultaneously started for all weighing cells allow an implementation of a plausibility check of the measurement results of the weighing cells during the evaluation of the measurement results in the common control unit.

If only those weighing cells comprising a bar with DMS have been cited in the preceding exemplary embodiments, other weighing cells that are based on a different weighing principle (for example on the principle of force compensation or on the principle of an oscillating side should not be precluded.

Although modifications and changes may be suggested by those skilled in the art, it is the intention of the inventors to embody within the patent warranted hereon all changes and modifications as reasonably and properly come within the scope of their contribution to the art.

We claim as our invention:

1. A dynamic scale comprising:
   a plurality of weighing units, wherein each of the weighing units is equipped at least with a weighing cell and with a weighing pan, wherein the weighing pan lies in an upper plane and the weighing cell is arranged between the lower plane and a lower plane removed from the upper plane in the direction of gravity;
   a plurality of sensors;
   a transport device for transport of a weighed good in a transport direction during weighing, said transport device comprising a motor that drives the transport device and an encoder; a control unit comprising inputs to which the sensors and the encoder are respectively electrically connected and comprising an output to which the motor is electrically connected;
   a first weighing unit and at least one second weighing unit comprising an arrangement of a second weighing pan serially adjacent in the transport path with respect to a first weighing pan with a simultaneous functionally cascaded arrangement of the weighing cells in the direction of gravity, the at least one second weighing unit is attached with the lower level situated in an x/z reference plane; and
   said control unit being configured to completely, simultaneously start the weighing processes in all weighing cells in a dynamic weighing mode, to control the motors depending on signals of the sensors and of the encoder to determine and regulate the transport velocity, and to evaluate the weight measurements, and thereby control the dynamic scale depending on the signals of the weighing cells.

2. A dynamic scale according to claim 1, wherein the weighing pan of an n-th weighing unit in the transport path is arranged at the last position in the transport direction z, and in that a weighing cell associated with the last weighing pan arranged in the transport path is mechanically firmly connected via an attachment block with a floor plate of the dynamic scale, wherein the floor plate is arranged lying in the x/z reference plane.

3. A dynamic scale according to claim 1, wherein the first weighing unit is configured for faster measurement of a smaller weight of the weighed good than the at least one second weighing unit.

4. A dynamic scale according to claim 1, comprising a third weighing unit and wherein the transport device of the first weighing unit has a transport belt, and a transport device of the third weighing unit has a transport device belt.

5. A dynamic scale according to claim 4, comprising a fourth sensor arranged near a downstream end of the transport device of the weighing pan of the third weighing unit and in that the control unit is connected at its inputs with the first sensor via a line for a signal; with the second sensor via a line for a signal; with the third sensor via a line for a signal; with the fourth sensor via a line for a signal; and via lines for the signals with the encoder of the transport device of the weighing pan of the first weighing unit and with the encoder of the transport device of the weighing pan of the third weighing unit; as well as at its outputs via lines for the signals with a first motor of the transport device of the weighing pan of the first weighing unit and with a third motor of the transport device of the weighing pan of the third weighing unit; and is electrically connected with a third motor of the transport device of the weighing pan of the third weighing unit.

6. A dynamic scale according to claim 4, wherein measurement results of the third weighing cell are used for a plausibility check of the results of the second weighing cell.

7. A dynamic scale according to claim 1, wherein the transport device of the first weighing unit has a transport belt, and the transport device of the second weighing unit has a transport belt.

8. A dynamic scale according to claim 7, wherein the control unit is electrically connected at the inputs of the first sensor via a line for a signal; with the second sensor via a line for a signal; with the third sensor via a line for a signal; and with the encoder of the transport device of the weighing pan of the first weighing unit and with the encoder of the transport device of the weighing pan of the second weighing unit via lines for the signals; and is electrically connected at the outputs with a first motor of the transport device of the weighing pan of the first weighing unit and with a second motor of the transport device of the weighing pan of the second weighing unit via lines for the signals.

9. A dynamic scale according to claim 1, wherein the weighing pans of the weighing units are shortened and adjacent to one another in the transport device and are arranged in the same upper level; at least one first weighing pan of the weighing pans adjacent to one another has the transport device for weighed goods; the weighing cells of each of the weighing units are arranged cascaded in the direction of gravity such that the weight of the weighed good, the total weight of the first weighing unit and the weight of at least one second weighing pan load the second weighing cell of the at least one second weighing unit, wherein the first weighing unit comprises the first weighing pan and the associated transport device; and in that the first weighing pan of the first weighing unit is arranged before the second weighing pan of the second weighing unit in the transport direction; the first sensor is arranged upstream of the transport device of the first weighing pan; the second sensor is arranged downstream of the transport device of the first weighing pan; and a third sensor is arranged near the downstream end of the transport device of the second weighing pan; and in that the control unit is programmed
   to activate a motor of the transport device of at least one first weighing unit upon arrival of a start signal,
   to start a plurality of weighing processes in a dynamic weighing mode when the first sensor signals an arrival of the leading edge of a supplied weighed good,
   when the second sensor signals an arrival of the leading edge of a supplied weighed good, to check whether the electronics of the connected weighing cell of the first weighing unit deliver or have not yet delivered a stable signal, wherein given a stable signal multiple measurement values are present for a measurement curve and the measurement curve has at least two inflection points and two reversal points after a rising portion, with which measurement curve the weight measurement can be successfully implemented,
   at least one motor with which the weighed good is transported further in the transport direction z on the weighing pan of the second weighing unit, and
   given a successful weight measurement, to induce an input/output unit of the common control unit to output a corresponding signal to an automatic feed station preceding the first weighing unit to supply a subsequent good being weighed to the weighing pan of the first weighing unit, or otherwise, to continue the weighing process with the weighing cell of the last used second weighing unit until the third sensor signals an arrival of the leading edge of a supplied weighed good, upon arrival of the leading edge of a supplied weighed good at the end of the transport device of the second weighing pan, to check whether the electronics of the connected weighing cell of the second weighing unit deliver or have not yet delivered a stable signal, and either to end the weight measurement successfully with the weighing cell of the second weighing unit, wherein the electronics of the connected weighing cell of the second weighing unit deliver a stable signal, or otherwise, to produce a switch of the dynamic scale from the dynamic weighing mode to a semi-dynamic weighing mode, wherein in the semi-dynamic weighing mode the at least one motor is controlled so that the transport of the weighed good is halted, or the weighed good is transported back to at least the last used weighing pan and is then weighed.

10. A dynamic scale according to claim 1, wherein measurement results of the second weighing cell are used for a plausibility check of results of the first weighing cell.

11. A dynamic scale according to claim 1, wherein the first weighing cell and the at least one second weighing cell are operated with a different preload; a first circuit board is mounted at a support that accepts the second weighing pan and the transport device installed on this, which first circuit board is concurrently weighed only by the second weighing cell; the first circuit board is mounted at an installation point which, due to said installation point, allows short electrical connections to control the first motor and to receive the measurement signals from the first weighing cell and/or allows a wireless connection.

12. Method to operate a dynamic scale, with a plurality of weighing units, comprising:

providing a first weighing unit and at least one second weighing unit, wherein each of the weighing units, individually has a respective weighing pan, a respective transport device, and a respective weighing cell, and mechanically connecting said weighing pan of said first weighing unit only to said weighing cell of said first weighing unit, and mechanically connecting both of said weighing pan of said first weighing unit and said weighing pan of said second weighing unit to said weighing cell of said second weighing unit;

with the transport device of the first weighing unit, supplying a good being weighed to the weighing pan of the first weighing unit, simultaneously start the weight measurement in all weighing cells, and implement a cascaded weight measurement of the good being weighed during its transport in the transport direction z, wherein the weighing cells of all weighing units are participating from the start in the weight measurement;

with the transport device of the first weighing unit, supplying a subsequent good being weighed to the weighing pan of the first weighing unit, and/or transporting the good being weighed further onto the weighing pan of the second weighing unit, with the respective transport device of the first and second weighing unit, for additional weigh measurement of the good being weighed during its transport in the transport direction z, depending on the signal of the weighing cell of the first weighing unit; and continuing to operate the dynamic scale depending on the signals of the weighing cells.

13. Method according to claim 12, comprising:

activating the motor of the transport device of at least the first weighing unit via a common control unit upon arrival of a start signal;

starting a plurality of weighing processes in a dynamic weighing mode via the control unit when a first sensor arranged at the upstream start of the first weighing unit signals an arrival of the leading edge of a supplied good being weighed;

with a second sensor arranged at the downstream end of the first weighing unit signals an arrival of the leading edge of a supplied good being weighed, checking via the control unit whether the electronic measurement unit of the connected first weighing cell deliver or have not yet delivered a stable signal, wherein given a stable signal multiple measurement values are present for a measurement curve and the measurement curve has at least two inflection points and two reversal points after a rising portion, with which measurement curve the weight measurement can be successfully implemented;

transporting the good being weighed further in the transport direction onto the weighing pan of the second weighing unit;

emitting an output signal from the control unit via an input/output unit to an automatic feed station preceding the first weighing unit to supply a subsequent good being weighed to the first weighing unit; or given an unsuccessful weight measurement, continue the weighing process with the second weighing cell until a third sensor arranged at the downstream end of the second weighing unit signals an arrival of the leading edge of a supplied good being weighed; and upon arrival of the leading edge of a supplied good being weighed, checking whether the electronic measurement unit of the connected weighing cell of the second weighing unit delivers or has not yet delivered a stable signal; and establishing that the weight measurement with the second weighing cell has successfully ended if the electronic measurement unit of the connected second weighing cell delivers a stable signal; or establishing that the weight measurement with the second weighing cell has not successfully ended if the electronic measurement unit of the connected second weighing cell does not deliver a stable signal;

switching the control unit from a dynamic weighing mode to a semi-dynamic weighing mode given an unsuccessful weight measurement, and activate the at least one motor via the control unit so that the transport of the weighed good is halted, or the weighed good is transported back to the last used weighing pan and is then weighed.

14. Method according to claim 12, comprising implementing a plausibility check of the measurement results of the weighing cells.

* * * * *